(12) United States Patent
Fujiyoshi et al.

(10) Patent No.: US 11,243,314 B2
(45) Date of Patent: Feb. 8, 2022

(54) RADIATION IMAGING APPARATUS AND RADIATION IMAGING SYSTEM

(71) Applicant: CANON KABUSHIKI KAISHA, Tokyo (JP)

(72) Inventors: Kentaro Fujiyoshi, Tokyo (JP); Minoru Watanabe, Yokohama (JP); Ryosuke Miura, Ichikawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 71 days.

(21) Appl. No.: 16/686,589

(22) Filed: Nov. 18, 2019

(65) Prior Publication Data
US 2020/0166659 A1 May 28, 2020

(30) Foreign Application Priority Data

Nov. 27, 2018 (JP) .............................. JP2018-221681
Sep. 20, 2019 (JP) .............................. JP2019-171854

(51) Int. Cl.
*G01T 1/24* (2006.01)

(52) U.S. Cl.
CPC .................................. *G01T 1/247* (2013.01)

(58) Field of Classification Search
CPC .... G01T 1/247; H04N 5/361; H04N 5/36963; H04N 5/32; A61B 6/44; A61B 6/542
See application file for complete search history.

(56) References Cited

U.S. PATENT DOCUMENTS

| | | | |
|---|---|---|---|
| 7,465,933 B2 | 12/2008 | Ishii et al. | |
| 7,541,617 B2 | 6/2009 | Mochizuki et al. | |
| 7,629,564 B2 | 12/2009 | Mochizuki et al. | |
| 7,645,976 B2 | 1/2010 | Watanabe et al. | |
| 7,750,422 B2 | 7/2010 | Watanabe et al. | |
| 7,812,313 B2 | 10/2010 | Mochizuki et al. | |
| 7,812,317 B2 | 10/2010 | Watanabe et al. | |
| 7,858,947 B2 | 12/2010 | Mochizuki et al. | |

(Continued)

FOREIGN PATENT DOCUMENTS

| | | |
|---|---|---|
| JP | 2015-213546 | 12/2015 |
| WO | 2017/094393 | 6/2017 |

OTHER PUBLICATIONS

U.S. Appl. No. 16/672,824, Sho Sato, filed Nov. 4, 2019.
U.S. Appl. No. 16/720,989, Katsuro Takenaka, filed Dec. 19, 2019.

*Primary Examiner* — Christine S. Kim
(74) *Attorney, Agent, or Firm* — Venable LLP

(57) ABSTRACT

A radiation imaging apparatus includes a first pixel, and a second pixel whose sensitivity for radiation is lower than sensitivity of the first pixel; and a decision unit configured to execute a reset operation of resetting charges in the pixels and a decision operation of deciding a radiation dose during irradiation to the apparatus. In the decision operation, the decision unit reads out signals from the first and second pixels at least once, and decides first and second correction values based on the signal read out from the first and second pixel respectively, and reads out signals from the first and second pixels after receiving a radiation irradiation start request, and decides the radiation dose during irradiation to the apparatus using values of the signals read out from the first and second pixels and the first and second correction values.

20 Claims, 14 Drawing Sheets

(56) References Cited

U.S. PATENT DOCUMENTS

| | | |
|---|---|---|
| 7,923,695 B2 | 4/2011 | Ishii et al. |
| 7,932,946 B2 | 4/2011 | Ishii et al. |
| 8,067,743 B2 | 11/2011 | Ishii et al. |
| 8,084,745 B2 | 12/2011 | Mochizuki et al. |
| 8,154,641 B2 | 4/2012 | Nomura et al. |
| 8,368,027 B2 | 2/2013 | Ishii et al. |
| 8,519,344 B2 | 8/2013 | Ishii et al. |
| 8,680,472 B2 | 3/2014 | Mochizuki et al. |
| 8,878,972 B2 | 11/2014 | Wayama et al. |
| 9,270,903 B2 | 2/2016 | Wayama et al. |
| 9,277,896 B2 | 3/2016 | Ofuji et al. |
| 9,423,513 B2 | 8/2016 | Watanabe et al. |
| 9,521,347 B2 | 12/2016 | Kawanabe et al. |
| 9,625,585 B1 | 4/2017 | Yokoyama et al. |
| 9,661,240 B2 | 5/2017 | Fujiyoshi et al. |
| 9,675,307 B2 | 6/2017 | Ofuji et al. |
| 9,726,767 B2 | 8/2017 | Kawanabe et al. |
| 9,835,732 B2 | 12/2017 | Fujiyoshi et al. |
| 9,838,638 B2 | 12/2017 | Furumoto et al. |
| 9,948,871 B2 | 4/2018 | Wayama et al. |
| 9,977,135 B2 | 5/2018 | Yokoyama et al. |
| 10,068,943 B2 | 9/2018 | Fujiyoshi et al. |
| 10,473,801 B2 | 11/2019 | Kawanabe et al. |
| 10,537,295 B2 | 1/2020 | Watanabe et al. |
| 2003/0090583 A1* | 5/2003 | Mizutani ............... H04N 5/374 348/297 |
| 2008/0136953 A1* | 6/2008 | Barnea ............... H04N 5/23248 348/308 |
| 2010/0207032 A1* | 8/2010 | Tsubota ............... G01T 1/17 250/370.09 |
| 2012/0199750 A1* | 8/2012 | Kondou ............... H04N 5/361 250/370.09 |
| 2013/0093927 A1* | 4/2013 | Yamada ............... H04N 5/32 348/241 |
| 2013/0342514 A1 | 12/2013 | Yokoyama et al. |
| 2014/0151769 A1 | 6/2014 | Wayama et al. |
| 2014/0154833 A1 | 6/2014 | Wayama et al. |
| 2017/0090041 A1 | 3/2017 | Yokoyama et al. |
| 2018/0008215 A1 | 1/2018 | Wayama et al. |
| 2019/0146103 A1 | 5/2019 | Ofuji et al. |
| 2019/0324156 A1 | 10/2019 | Miura et al. |
| 2019/0391629 A1 | 12/2019 | Yokoyama et al. |
| 2020/0008766 A1 | 1/2020 | Watanabe et al. |
| 2020/0041664 A1 | 2/2020 | Furumoto et al. |

\* cited by examiner

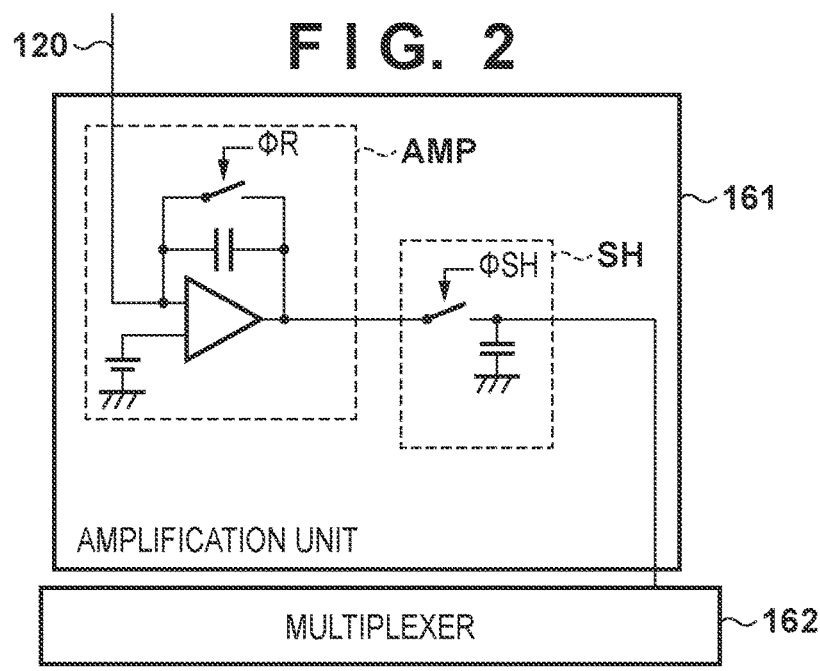
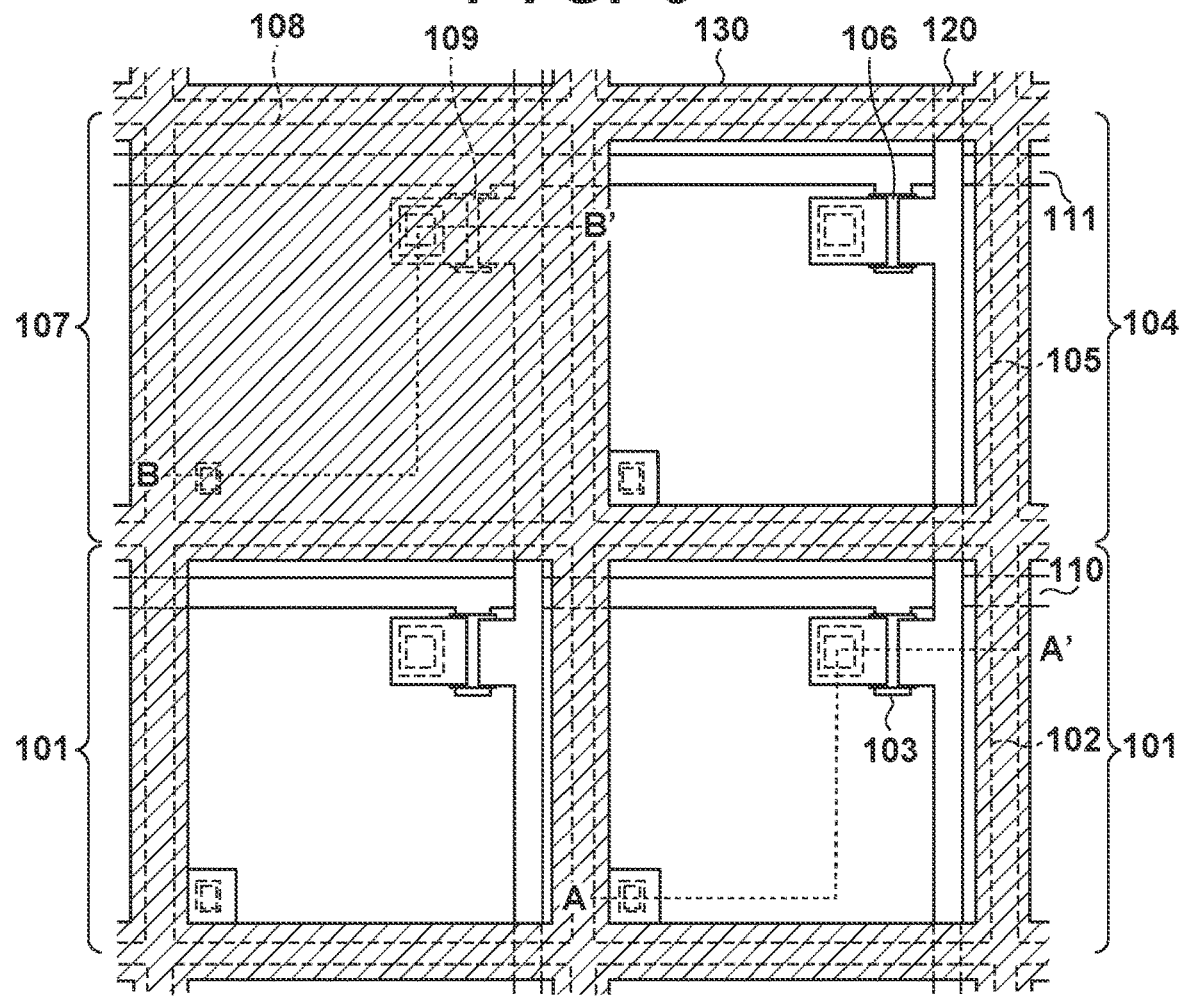

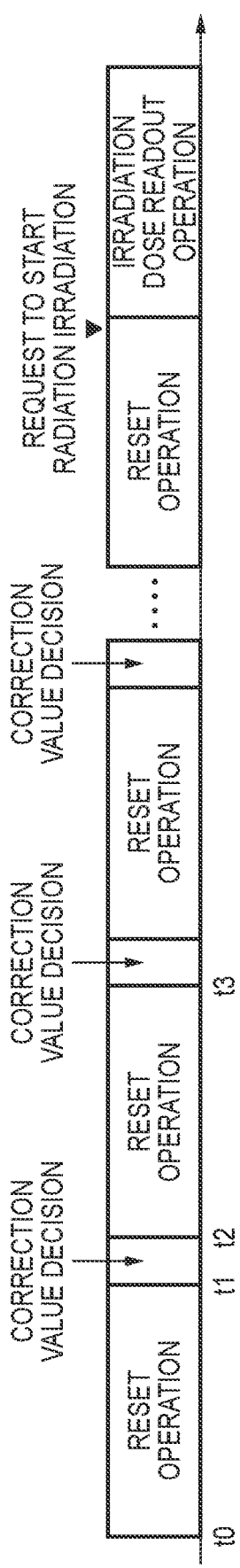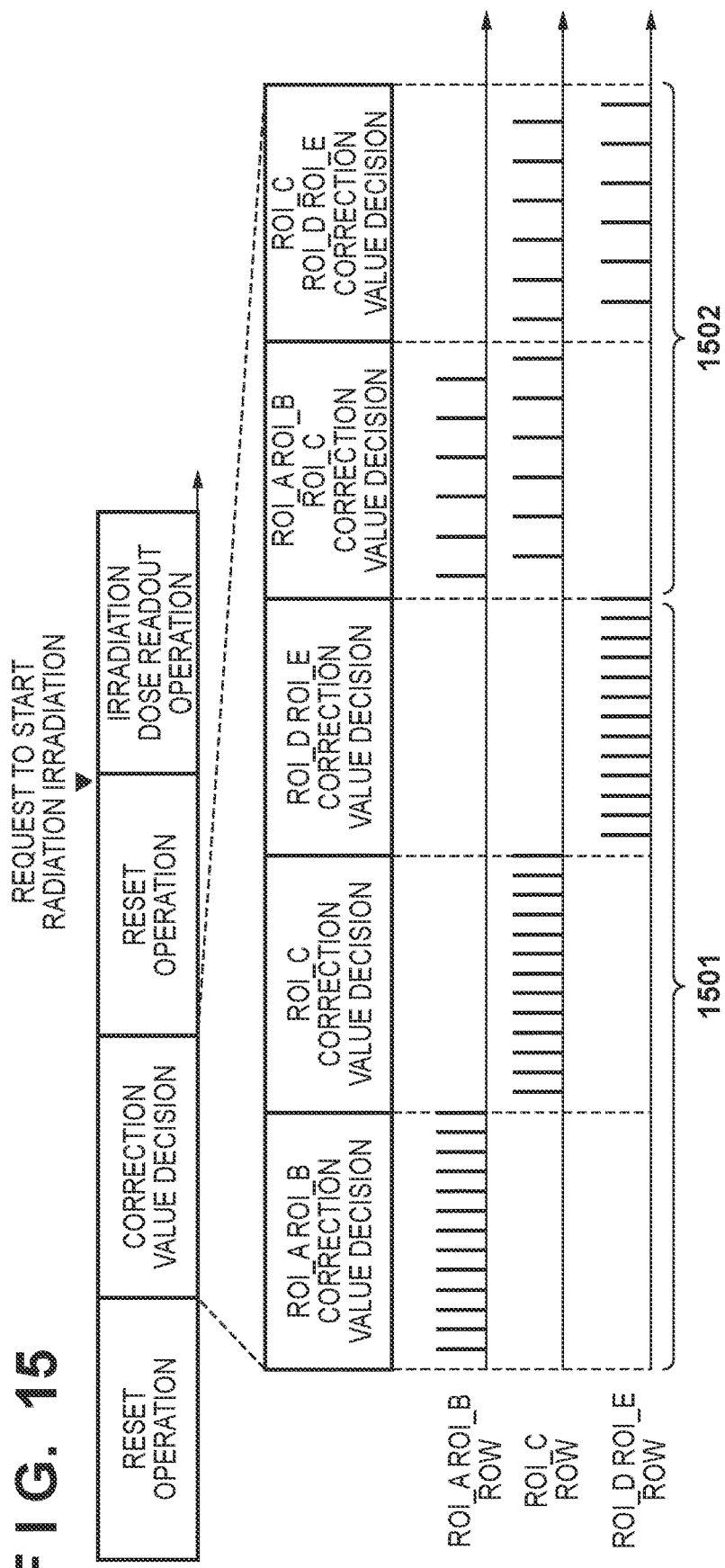

RADIATION IMAGING APPARATUS AND RADIATION IMAGING SYSTEM

BACKGROUND OF THE INVENTION

Field of the Invention

The present invention relates to a radiation imaging apparatus and a radiation imaging system.

Description of the Related Art

There is known a radiation imaging apparatus having an AEC (Automatic Exposure Control) function. Such radiation imaging apparatus can measure a radiation dose during irradiation and end radiation irradiation in accordance with the measurement result. For example, the radiation imaging apparatus monitors a radiation dose by operating only pixels set for radiation detection at high speed during radiation irradiation. The radiation imaging apparatus performs a reset operation of sequentially operating respective pixels to reset dark charges accumulated in the respective pixels until a radiation irradiation start request is received. Japanese Patent Laid-Open No. 2015-213546 describes a radiation imaging apparatus that performs a reset operation of respective pixels until a request to start radiation irradiation is received, and operates pixels for radiation detection at high speed after the request to start radiation irradiation is received.

SUMMARY OF THE INVENTION

The radiation imaging apparatus described in Japanese Patent Laid-Open No. 2015-213546 performs a reset operation for removing charges accumulated in the respective pixels until a request to start radiation irradiation is received. It takes time (for example, about 100 ms) for the value of a signal to become stable after the end of the reset operation. Thus, to acquire a correct signal, it may be necessary to wait for some time after the end of the reset operation. On the other hand, if acquisition of a signal is delayed until the value of the signal becomes stable, the time from when the request to start radiation irradiation is received until radiation irradiation becomes possible is prolonged. In a method described in Japanese Patent Laid-Open No. 2015-213546, the time until radiation irradiation becomes possible and the correctness of the decided radiation dose have a tradeoff relationship. An aspect of the present invention provides a technique of accurately deciding a radiation dose during irradiation while shortening the time until radiation irradiation becomes possible.

According to an embodiment of the present invention, a radiation imaging apparatus comprising: a plurality of pixels including a first pixel, and a second pixel whose sensitivity for radiation is lower than sensitivity of the first pixel; and a decision unit configured to execute a reset operation of resetting charges accumulated in the plurality of pixels and a decision operation of deciding a radiation dose during irradiation to the radiation imaging apparatus, wherein the decision unit ends the reset operation and starts the decision operation before a start of radiation irradiation, and in the decision operation, the decision unit reads out signals from the first pixel and the second pixel at least once, and decides a first correction value based on the signal read out from the first pixel and a second correction value based on the signal read out from the second pixel, and reads out signals from the first pixel and the second pixel after receiving a radiation irradiation start request, and decides the radiation dose during irradiation to the radiation imaging apparatus using a value of the signal read out from the first pixel, a value of the signal read out from the second pixel, the first correction value, and the second correction value is provided.

Further features of the present invention will become apparent from the following description of exemplary embodiments (with reference to the attached drawings).

BRIEF DESCRIPTION OF THE DRAWINGS

FIG. 2 is a circuit diagram showing the arrangement of an amplification unit according to the first embodiment of the present invention;

FIG. 3 is a plan view showing the arrangements of respective pixels according to the first embodiment of the present invention;

FIG. 14 is a timing chart showing a correction value decision method for the radiation imaging apparatus according to the fourth embodiment of the present invention;

FIG. 15 is a timing chart showing a correction value decision method for a radiation imaging apparatus according to the fifth embodiment of the present invention.

DESCRIPTION OF THE EMBODIMENTS

Figure 1:
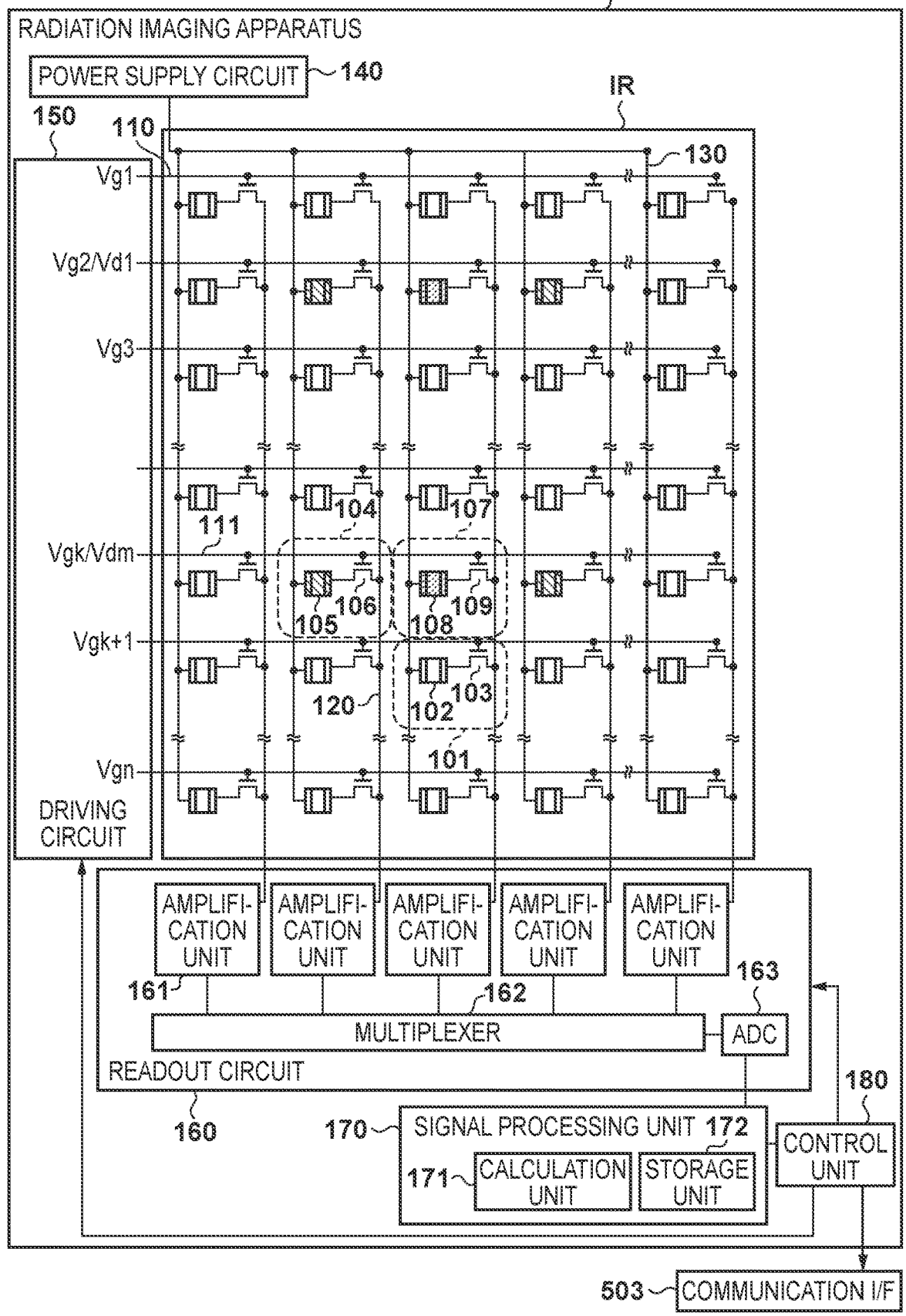
FIG. 1 is a circuit diagram showing the arrangement of a radiation imaging apparatus according to the first embodiment of the present invention.

Embodiments of the present invention will be described below with reference to the accompanying drawings. The same reference numerals denote similar elements throughout the various embodiments and a repetitive description thereof will be omitted. These embodiments can be changed and combined, as needed.

FIG. 1 shows an example of the arrangement of a radiation imaging apparatus 100 according to the first embodiment of the present invention. The radiation imaging apparatus 100 includes a plurality of pixels arrayed in an imaging region IR to form a plurality of rows and a plurality of columns, a plurality of driving lines 110, and a plurality of signal lines 120. The plurality of driving lines 110 are arranged in correspondences with the plurality of rows of the pixels, and each of the driving lines 110 corresponds to any one of the pixel rows. The plurality of signal lines 120 are arranged in correspondence with the plurality of columns of the pixels, and each of the signal lines 120 corresponds to any one of the pixel columns.

The plurality of pixels include a plurality of imaging pixels 101 used to acquire a radiation image, one or more detection pixels 104 used to monitor a radiation irradiation dose, and one or more correction pixels 107 used to correct the radiation irradiation dose. The sensitivity of the correction pixel 107 for radiation is lower than that of the detection pixel 104 for radiation.

Each imaging pixel 101 includes a conversion element 102 for converting radiation into an electrical signal, and a switch element 103 for connecting the corresponding signal line 120 and the conversion element 102. Each detection pixel 104 includes a conversion element 105 for converting radiation into an electrical signal, and a switch element 106 for connecting the corresponding signal line 120 and the conversion element 105. Each detection pixel 104 is arranged to be included in the row and column formed by the plurality of imaging pixels 101. Each correction pixel 107 includes a conversion element 108 for converting radiation into an electrical signal, and a switch element 109 for connecting the corresponding signal line 120 and the conversion element 108. Each correction pixel 107 is arranged to be included in the row and column formed by the plurality of imaging pixels 101. In FIG. 1 and the subsequent drawings, the imaging pixels 101, the detection pixels 104, and the correction pixels 107 are distinguished from each other by hatching the conversion elements 102, 105, and 108 differently.

Each of the conversion elements 102, 105, and 108 may be formed by a scintillator for converting radiation into light and a photoelectric conversion element for converting the light into an electrical signal. The scintillator is generally made in the form of a sheet so as to cover the imaging region IR and is shared by the plurality of pixels. Alternatively, each of the conversion elements 102, 105, and 108 may be formed by a conversion element for directly converting radiation into an electrical signal.

Each of the switch elements 103, 106, and 109 may include, for example, a thin film transistor (TFT) in which an active region is formed by a semiconductor such as amorphous silicon or polysilicon.

The first electrode of the conversion element 102 is connected to the first main electrode of the switch element 103, and the second electrode of the conversion element 102 is connected to a bias line 130. One bias line 130 extends in the column direction and is commonly connected to the second electrodes of the plurality of conversion elements 102 arrayed in the column direction. The bias line 130 receives a bias voltage Vs from a power supply circuit 140. The second main electrodes of the switch elements 103 of one or more imaging pixels 101 included in one column are connected to one signal line 120. The control electrodes of the switch elements 103 of one or more imaging pixels 101 included in one row are connected to one driving line 110.

Each of the detection pixel 104 and the correction pixel 107 has the same pixel arrangement of the imaging pixel 101, and is connected to the corresponding driving line 110 and the corresponding signal line 120. The detection pixel 104 and the correction pixel 107 are connected to the signal lines 120 exclusively. That is, the correction pixel 107 is not connected to the signal line 120 to which the detection pixel 104 is connected. The detection pixel 104 is not connected to the signal line 120 to which the correction pixel 107 is connected. The imaging pixel 101 may be connected to the signal line 120 to which the detection pixel 104 or the correction pixel 107 is connected.

A driving circuit 150 is configured to supply driving signals to driving target pixels through the plurality of driving lines 110 in accordance with a control signal from a control unit 180. In this embodiment, the driving signals are signals for turning on the switch elements included in the driving target pixels. The switch element of each pixel is turned on by a signal of high level, and turned off by a signal of low level. Therefore, the signal of high level will be referred to as a driving signal hereinafter. By supplying the driving signal to a pixel, a signal accumulated in the conversion element of the pixel can be read out by a readout circuit 160. When the driving line 110 is connected to at least one of the detection pixel 104 and/or the correction pixel 107, the driving line 110 will be referred to as a detection driving line 111 hereinafter.

The readout circuit 160 is configured to read out signals from the plurality of pixels through the plurality of signal lines 120. The readout circuit 160 includes a plurality of amplification units 161, a multiplexer 162, and an analog-to-digital converter (to be referred to as an A/D converter hereinafter) 163. Each of the plurality of signal lines 120 is connected to a corresponding one of the plurality of amplification units 161 of the readout circuit 160. One signal line 120 corresponds to one amplification unit 161. The multiplexer 162 selects the plurality of amplification units 161 in a predetermined order, and supplies the signal from the selected amplification unit 161 to the A/D converter 163. The A/D converter 163 converts the supplied signal into a digital signal, and outputs it.

Signals read out from the imaging pixels 101 are supplied to a signal processing unit 170, and undergo processing such as calculation processing and storage processing by the signal processing unit 170. More specifically, the signal processing unit 170 includes a calculation unit 171 and a storage unit 172. The calculation unit 171 generates a radiation image based on the signals read out from the imaging pixels 101, and supplies the radiation image to the control unit 180. Signals read out from the detection pixel 104 and the correction pixel 107 are supplied to the signal processing unit 170, and undergo processing such as calculation processing and storage processing by the calculation unit 171. More specifically, the signal processing unit 170 outputs information indicating radiation irradiation to the radiation imaging apparatus 100 based on the signals read out from the detection pixel 104 and the correction pixel 107. For example, the signal processing unit 170 detects radiation irradiation to the radiation imaging apparatus 100, and decides a radiation irradiation dose and/or an integration irradiation dose.

The control unit 180 controls the driving circuit 150 and the readout circuit 160 based on the information from the signal processing unit 170. The control unit 180 controls, for example, the start and end of exposure (accumulation of charges corresponding to emitted radiation in the imaging pixels 101) based on the information from the signal processing unit 170.

To decide the radiation irradiation dose, the control unit 180 controls the driving circuit 150 to scan only the detection driving line 111, thereby enabling only signals from the detection pixel 104 and the correction pixel 107 to be read out. Next, the control unit 180 controls the readout circuit 160 to read out signals of columns corresponding to the detection pixel 104 and the correction pixel 107, thereby outputting the signals as information indicating a radiation irradiation dose. Such operation allows the radiation imaging apparatus 100 to obtain irradiation information in the detection pixel 104 during radiation irradiation.

FIG. 2 shows an example of the detailed circuit arrangement of the amplification unit 161. The amplification unit 161 includes a differential amplification circuit AMP and a sample/hold circuit SH. The differential amplification circuit AMP amplifies a signal appearing in the signal line 120 and outputs it. The control unit 180 can reset the potential of the signal line 120 by supplying a control signal φR to the switch element of the differential amplification circuit AMP. An output from the differential amplification circuit AMP can be held in the sample/hold circuit SH. The control unit 180 causes the sample/hold circuit SH to hold the signal by supplying a control signal φSH to the switch element of the sample/hold circuit SH. The signal held in the sample/hold circuit SH is read out by the multiplexer 162.

Examples of the structures of the pixels of the radiation imaging apparatus 100 will be described with reference to FIGS. 3, 4A, and 4B. FIG. 3 is a plan view showing the arrangement of the imaging pixels 101, the detection pixel 104, and the correction pixel 107 in the radiation imaging apparatus 100. The plan view is equivalent to orthographic projection on a plane parallel to the imaging region IR of the radiation imaging apparatus 100. As indicated by hatching, a metal layer is arranged on the conversion element 108 of the correction pixel 107 to shield the conversion element 108.

Figure 4A:
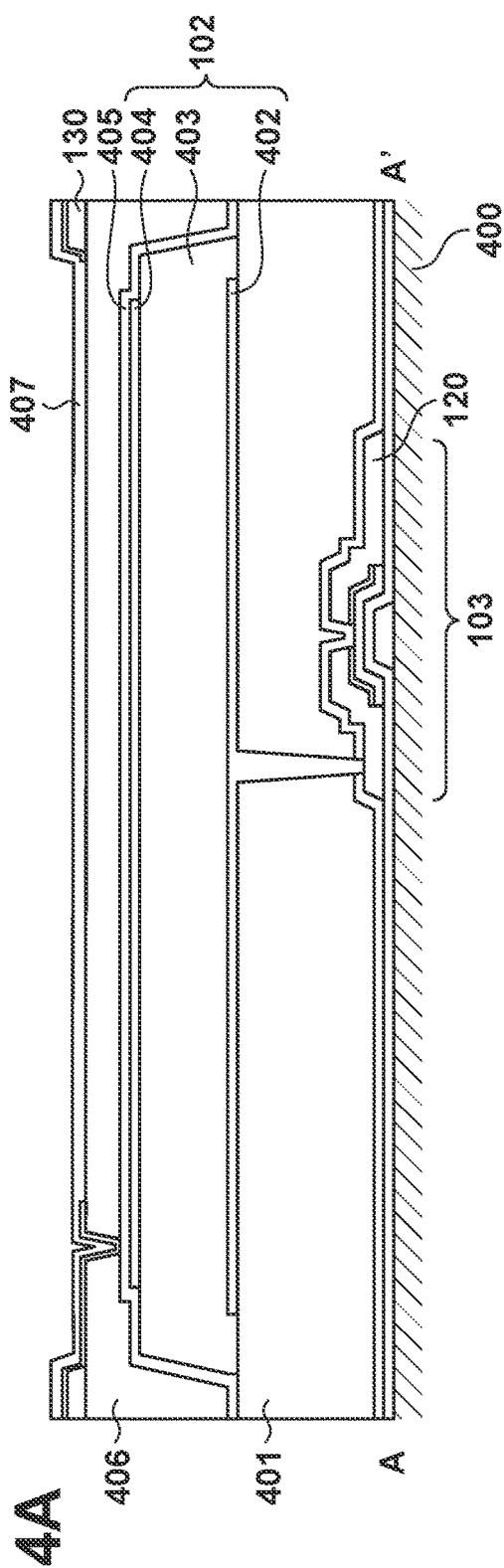
FIGS. 4A and 4B are sectional views respectively showing the arrangements of the respective pixels according to the first embodiment of the present invention.

FIG. 4A is a sectional view of the imaging pixel 101 taken along a line A-A' in FIG. 3. The sectional view of the detection pixel 104 is the same as that of the imaging pixel 101. The switch element 103 is arranged on an insulating support substrate 400 such as a glass substrate. The switch element 103 may be a TFT (Thin Film Transistor). An interlayer insulation layer 401 is arranged on the switch element 103. The conversion element 102 is arranged on the interlayer insulation layer 401. The conversion element 102 is a photoelectric conversion element capable of converting light into an electrical signal. The conversion element 102 is formed by, for example, an electrode 402, a PIN photodiode 403, and an electrode 404. The conversion element 102 may be formed by a MIS sensor, instead of the PIN photodiode.

A protection film 405, an interlayer insulation layer 406, the bias line 130, and a protection film 407 are sequentially arranged on the conversion element 102. A planarizing film and a scintillator (neither is shown) are arranged on the protection film 407. The electrode 404 is connected to the bias line 130 through a contact hole. Light-transmitting ITO is used as the material of the electrode 404, and the electrode 404 can transmit light converted from radiation by the scintillator (not shown).

Figure 4B:
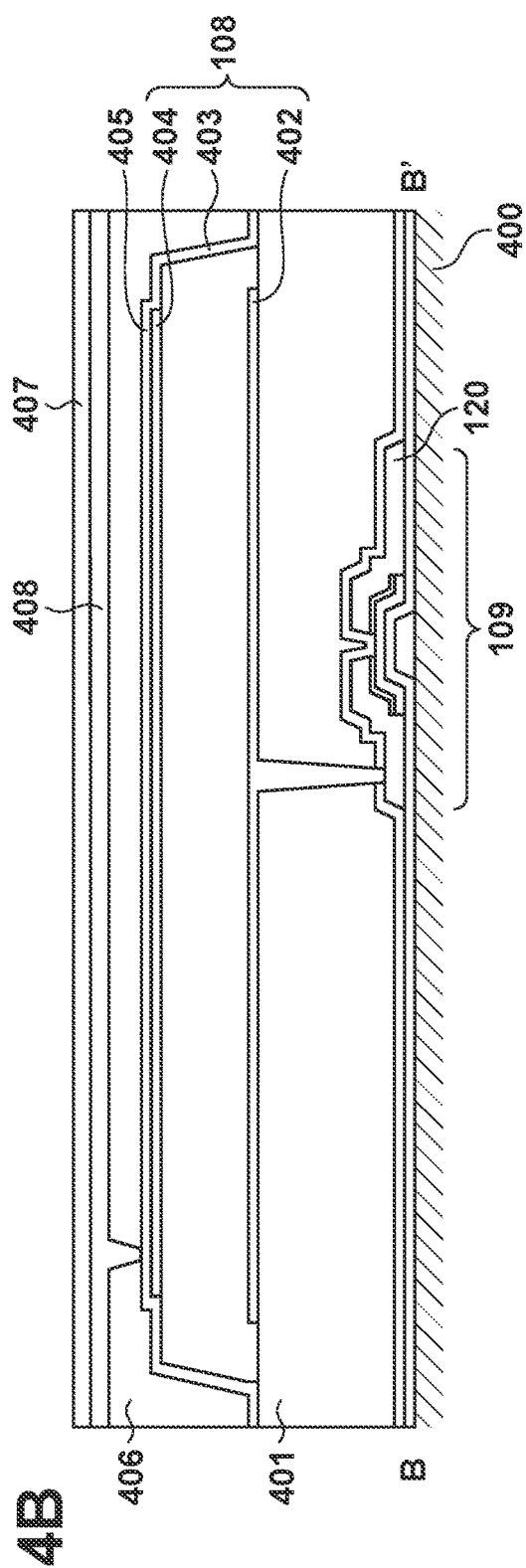

FIG. 4B is a sectional view of the correction pixel 107 taken along a line B-B' in FIG. 3. The correction pixel 107 is different from the imaging pixel 101 and the detection pixel 104 in that the conversion element 108 is covered with a light-shielding member 408, and the remaining points may be the same. The light-shielding member 408 is formed by, for example, a metal layer that is the same layer as that of the bias line 130. Since the conversion element 108 of the correction pixel 107 is covered with the light-shielding member 408, the sensitivity of the correction pixel 107 for radiation is significantly lower than those of the imaging pixel 101 and the detection pixel 104. It can also be said that charges accumulated in the conversion element 108 of the correction pixel 107 are not caused by radiation.

Figure 5:
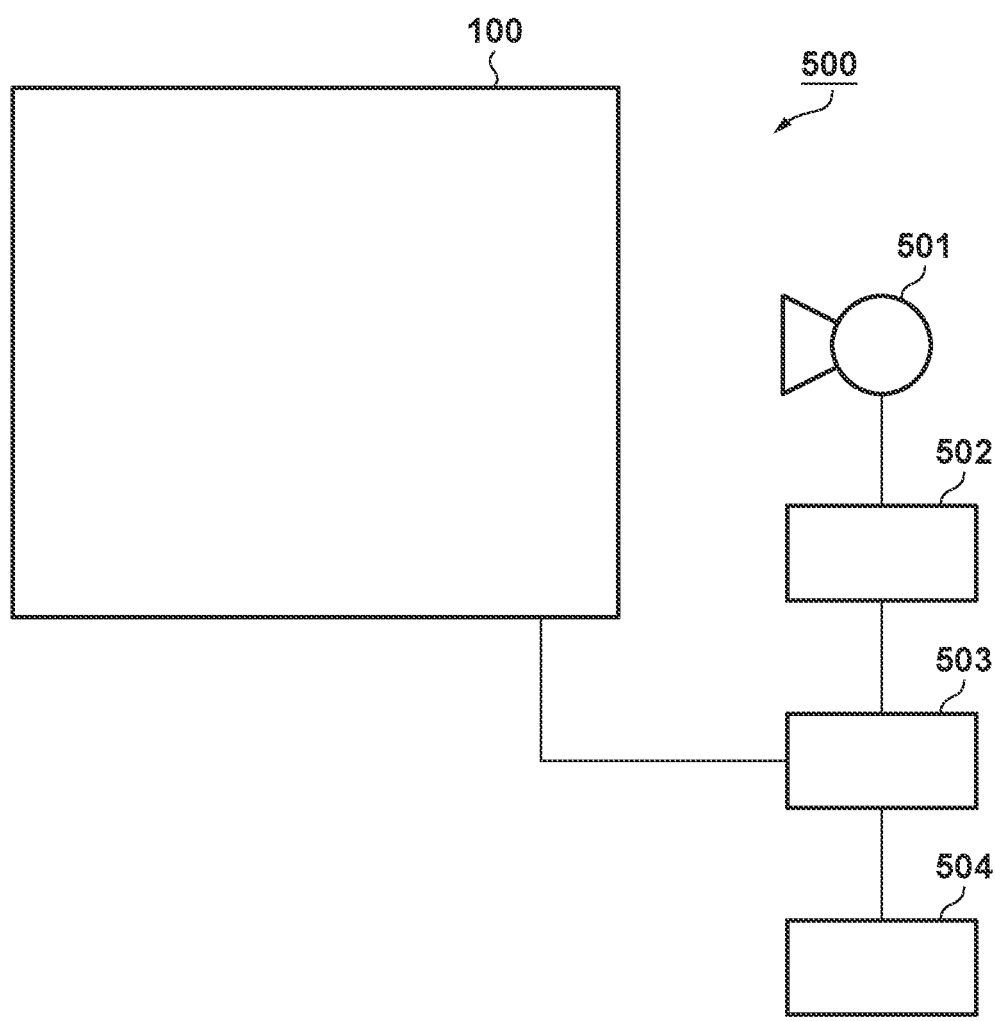
FIG. 5 is a view showing an example of the arrangement of a radiation imaging system including a radiation imaging apparatus according to the present invention.

FIG. 5 shows an example of the arrangement of a radiation imaging system 500 including the radiation imaging apparatus 100. The radiation imaging system 500 includes the radiation imaging apparatus 100, a radiation source 501, a radiation source interface 502, a communication interface 503, and a controller 504.

A dose, an upper limit irradiation time (ms), a tube current (mA), a tube voltage (kV), a region of interest (ROI) as a region where radiation should be monitored, and the like are input to the controller 504. When an exposure switch attached to the radiation source 501 is operated, the controller 504 transmits a start request signal to the radiation imaging apparatus 100. The start request signal is a signal for requesting to start radiation irradiation. In response to reception of the start request signal, the radiation imaging apparatus 100 starts to prepare to accept radiation irradiation. If the radiation imaging apparatus 100 is ready, it transmits a start enable signal to the radiation source interface 502 via the communication interface 503. The start enable signal is a signal for making a notification that radiation irradiation can start. In response to reception of the start enable signal, the radiation source interface 502 causes the radiation source 501 to start radiation irradiation.

After a threshold of the integration value of an emitted radiation dose is reached, the radiation imaging apparatus 100 transmits an end request signal to the radiation source interface 502 via the communication interface 503. The end request signal is a signal for requesting to end the radiation irradiation. In response to reception of the end request signal, the radiation source interface 502 causes the radiation source 501 to end the radiation irradiation. The threshold of the dose is decided by the control unit 180 based on the input value of the dose, a radiation irradiation intensity, a communication delay between the units, a processing delay, and the like. If the radiation irradiation time reaches the input upper limit irradiation time, the radiation source 501 stops the radiation irradiation even if the end request signal is not received.

After the radiation irradiation stops, the radiation imaging apparatus 100 sequentially scans the driving lines 110 (the driving lines 110 except for the detection driving line 111) to which only the imaging pixels 101 are connected, and the image signal of each imaging pixel 101 is read out by the readout circuit 160, thereby acquiring a radiation image. Since charges accumulated in the detection pixel 104 are read out during radiation irradiation, and the correction pixel 107 is shielded, signals from these pixels cannot be used to form a radiation image. To cope with this, the signal processing unit 170 of the radiation imaging apparatus 100 performs interpolation processing using the pixel values of the imaging pixels 101 around the detection pixel 104 and the correction pixel 107, thereby interpolating pixel values at the positions of these pixels.

Figure 6:
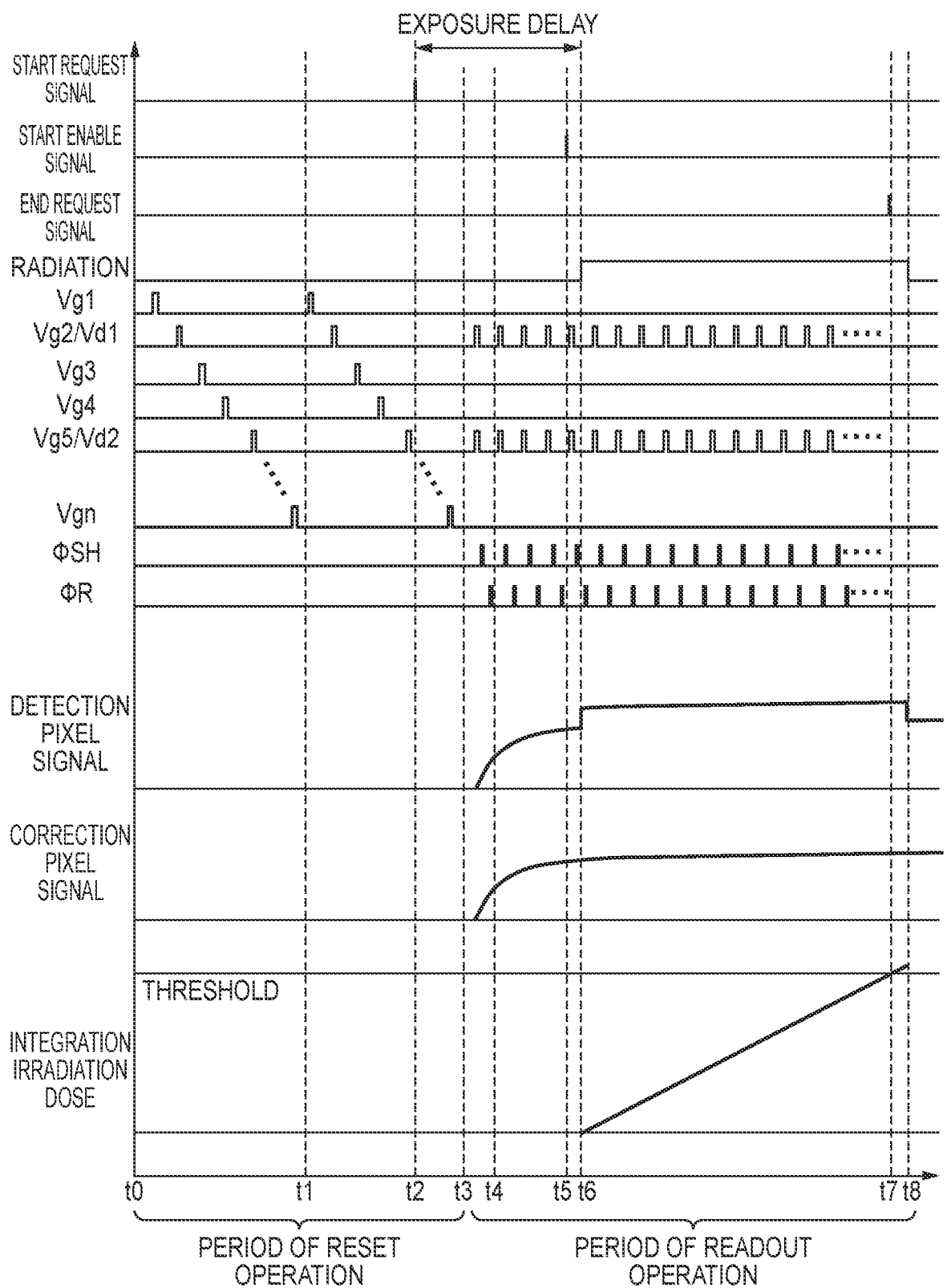
FIG. 6 is a timing chart showing the operation of the radiation imaging apparatus according to the first embodiment of the present invention.

An example of the operation of the radiation imaging apparatus 100 will be described with reference to FIG. 6. This operation is executed when the signal processing unit 170 and the control unit 180 for controlling the driving circuit 150 and the readout circuit 160 cooperate with each other. Therefore, the combination of the signal processing unit 170 and the control unit 180 may be referred to as a decision unit. In FIG. 6, "radiation" indicates whether the radiation imaging apparatus 100 is irradiated with radiation. At low level, no radiation irradiation is performed. At high level, radiation irradiation is performed. "Vg1" to "Vgn" represent driving signals supplied from the driving circuit 150 to the plurality of driving lines 110. "Vgk" corresponds to the driving line 110 of the kth row (k=1, . . . , the total number of driving lines). As described above, some of the plurality of driving lines 110 are also called the detection driving lines 111. The jth detection driving line 111 is represented by "Vdj" (j=1, . . . , the total number of detection driving lines). φSH represents the level of the control signal supplied to the sample/hold circuit SH of the amplification unit 161. φR represents the level of the control signal supplied to the differential amplification circuit AMP of the amplification unit 161. A "detection pixel signal" indicates the value of a signal read out from the detection pixel 104. A "correction pixel signal" indicates the value of a signal read out from the correction pixel 107. An "integration irradiation dose" indicates the integration value of radiation with which the radiation imaging apparatus 100 is irradiated. A method of deciding the integration value will be described later.

At time t0, the control unit 180 starts a reset operation of the plurality of pixels. The reset operation is an operation of removing charges accumulated in the conversion elements of the respective pixels and, more specifically, an operation of rendering the switch elements of the respective pixels conductive by supplying the driving signals to the driving lines 110. The control unit 180 controls the driving circuit 150 to reset the pixels connected to the driving line 110 of the first row. Subsequently, the control unit 180 resets the pixels connected to the driving line 110 of the second row. The control unit 180 repeats the operation up to the driving line 110 of the last row. At time t1, after the end of the reset operation of the driving line 110 of the last row, the control unit 180 repeats the reset operation from the driving line 110 of the first row again.

At time t2, the control unit 180 receives the start request signal from the controller 504. In response to reception of the start request signal, the control unit 180 performs the reset operation up to the last row, and then ends the reset operation. The control unit 180 may end the reset operation before performing the reset operation up to the last row, and shift to the next processing. For example, if the control unit 180 receives the start request signal during the reset operation of the driving line 110 of the kth row, it may shift to the next processing without performing the reset operations of the driving lines 110 of the (k+1)th row and subsequent rows. In this case, by performing adjustment of driving for acquiring a radiation image and image processing for the radiation image, a step that can be generated in the radiation image may be reduced.

At time t3, the control unit 180 starts a decision operation for deciding the radiation dose during irradiation to the radiation imaging apparatus 100. In the decision operation, the control unit 180 repeatedly executes a readout operation of reading out signals from the detection pixel 104 and the correction pixel 107. A first one or more of the plurality of readout operations are performed to decide correction values, and the latter half of the repetitive readout operations are performed to continuously decide the radiation dose at each point of time.

The readout operation is executed for the detection driving line 111 but is not executed for the remaining driving lines 110. More specifically, the driving circuit 150 supplies the driving signals to the driving lines 110 (that is, the detection driving lines 111), each of which is connected to at least one of the detection pixel 104 and/or the correction pixel 107, among the plurality of driving lines 110. However, the driving circuit 150 supplies no driving signals to the driving lines 110, each of which is connected to neither the detection pixel 104 nor the correction pixel 107, among the plurality of driving lines 110. Furthermore, the driving circuit 150 simultaneously supplies the driving signals to the driving lines 110, each of which is connected to at least one of the detection pixel 104 and/or the correction pixel 107, among the plurality of driving lines 110. Thus, the signals from the plurality of pixels connected to the same signal line 120 are combined, and read out by the readout circuit 160. Since the detection pixel 104 and the correction pixel 107 are connected to the signal lines 120 exclusively, the readout circuit 160 can read out the signals of the pixels of different sensitivities separately.

In one readout operation, the control unit 180 performs the operation from time t3 to time t4. More specifically, the control unit 180 temporarily supplies the driving signals to one or more detection driving lines 111. After that, the control unit 180 holds, in the sample/hold circuit SH, the signals read out from the pixels by the readout circuit 160 via the signal line 120 by temporarily setting the control signal φSH at high level. Subsequently, the control unit 180 resets the readout circuit 160 (more specifically, the differential amplification circuit AMP of the amplification unit 161) by temporarily setting the control signal φR at high level. If a region of interest is set in the imaging region IR, it is not necessary to read out a signal from the detection pixel 104 not included in the region of interest.

To decide correction values, the control unit 180 performs the readout operation a predetermined number of times, which is one or more. The signal processing unit 170 decides a correction value Od based on the signals read out from the detection pixel 104 by a predetermined number of the readout operations, and a correction value Oc based on the signals read out from the correction pixel 107 by the predetermined number of readout operations. Decision of the correction value Od will be described in detail. If the predetermined number is one, the number of signals read out from the detection pixel 104 is one, so that the signal processing unit 170 decides the value of the signal as the correction value Od. If the predetermined number is two or more, the signal processing unit 170 decides the average value of the plurality of readout signals as the correction value Od. Instead of the average value, another statistic may be used. The correction value Oc is decided based on the pixels read out from the correction pixel 107 in the same manner. The signal processing unit 170 stores the thus decided correction values Od and Oc in the storage unit 172 to be usable in subsequent processing.

After the end of one or more readout operations, the control unit 180 transmits, at time t5, a start enable signal to the radiation source interface 502. The above-described correction values Od and Oc may be decided before or after the start enable signal is transmitted. After the start enable signal is transmitted, the control unit 180 repeatedly executes the above-described readout operation. The signal processing unit 170 measures a radiation irradiation dose DOSE for each readout operation, and determines whether the integration value of the irradiation dose DOSE exceeds a threshold. After time t5, radiation irradiation starts at time t6.

A method of deciding the irradiation dose DOSE will be described below. The value of the signal read out from the detection pixel 104 by the latest readout operation is represented by Sd. The value of the signal read out from the correction pixel 107 by the latest readout operation is represented by Sc. The signal processing unit 170 calculates the irradiation dose DOSE by applying Sd, Sc, Od, and Oc to equation (1) below.

$$DOSE=(Sd-Od)-(Sc-Oc) \quad (1)$$

According to this equation, the irradiation dose DOSE is decided based on the difference between the value Sc of the signal read out from the correction pixel 107 after transmitting the start enable signal and the correction value Oc decided based on the signal read out from the correction pixel 107 before transmitting the start enable signal.

The signal processing unit 170 may calculate the irradiation dose DOSE by applying Sd, Sc, Od, and Oc to equation (2) below, instead of equation (1) above.

$$DOSE=Sd-Od \times Sc/Oc \quad (2)$$

According to this equation, the irradiation dose DOSE is decided based on a ratio between the value Sc of the signal read out from the correction pixel 107 after transmitting the start enable signal and the correction value Oc decided based on the signal read out from the correction pixel 107 before transmitting the start enable signal.

As shown in FIG. 6, the signal read out from the detection pixel 104 largely temporally changes immediately after the end of the reset operation (immediately after time t3), and becomes stable with time (for example, in about 100 ms). Therefore, even if the irradiation dose DOSE is calculated using only Sd and Od obtained from the detection pixel 104, an offset amount cannot be removed sufficiently. If the start of the readout operation for acquiring the correction value Od is delayed until the signal read out from the detection pixel 104 becomes stable, the time (the time from time t2 to time t6, that is, a so-called exposure delay) from when the start request signal is transmitted until actual radiation irradiation starts is prolonged.

In this embodiment, the values (Sc and Oc) of the signals read out from the correction pixel 107 are further used to decide the irradiation dose DOSE. Since the sensitivity of the correction pixel 107 for radiation is very low, the value Sc of the signal read out from the correction pixel 107 after the start of radiation irradiation is considered to represent the offset component of the value Sd of the signal read out from the detection pixel 104. Furthermore, in this embodiment, the irradiation dose DOSE is decided using the correction values Od and Oc based on the signals read out from the detection pixel 104 and the correction pixel 107 before the start of radiation irradiation. Therefore, differences (a difference in channel of a detection circuit, differences in parasitic resistance and parasitic capacitance of each pixel, and the like) in characteristics unique to each pixel can be corrected.

When the integration irradiation dose reaches the threshold at time t7, the control unit 180 transmits the end request signal to the radiation source interface 502. Instead, the control unit 180 may estimate time at which the integration irradiation dose reaches the threshold, and transmit the end request signal at estimated time. At time t8, in response to reception of the end request signal, the radiation source interface 502 causes the radiation source 501 to end the radiation irradiation.

In the above-described example, the control unit 180 starts the predetermined number of readout operations for deciding the correction values Od and Oc immediately after the end of the reset operation. Instead, the control unit 180 may start the predetermined number of readout operations after a predetermined time (for example, several ms to several tens of ms) elapses since the end of the reset operation. This can suppress readout of a signal during a period in which a temporal change is especially large.

The positional relationship among the detection pixels 104 and the correction pixels 107 will be described with reference to FIGS. 7 to 10. In FIGS. 7 to 10, to clarify the positions of the detection pixels 104 and the correction pixels 107, the imaging pixels 101 are omitted. In these examples, regions ROI_A to ROI_E of interest are set in parts of the imaging region IR. The regions of interest are regions to be monitored by AEC. The detection pixels 104 are arranged in each of the regions of interest. The variation amount (or variation rate) of the offset component is determined mainly based on an operation method for switching from the reset operation to the readout operation and an operation time, and the positional relationship among the detection pixels 104 and the correction pixels 107 hardly contributes to the variation amount of the offset component. Therefore, the number of correction pixels 107 may be smaller than that of detection pixels 104. For example, one correction pixel 107 may be arranged for several to several tens of detection pixels 104. Furthermore, Sd, Sc, Od, and Oc acquired for the respective signal lines 120 may respectively be averaged over the plurality of signal lines 120. This can reduce noise.

Figure 7:
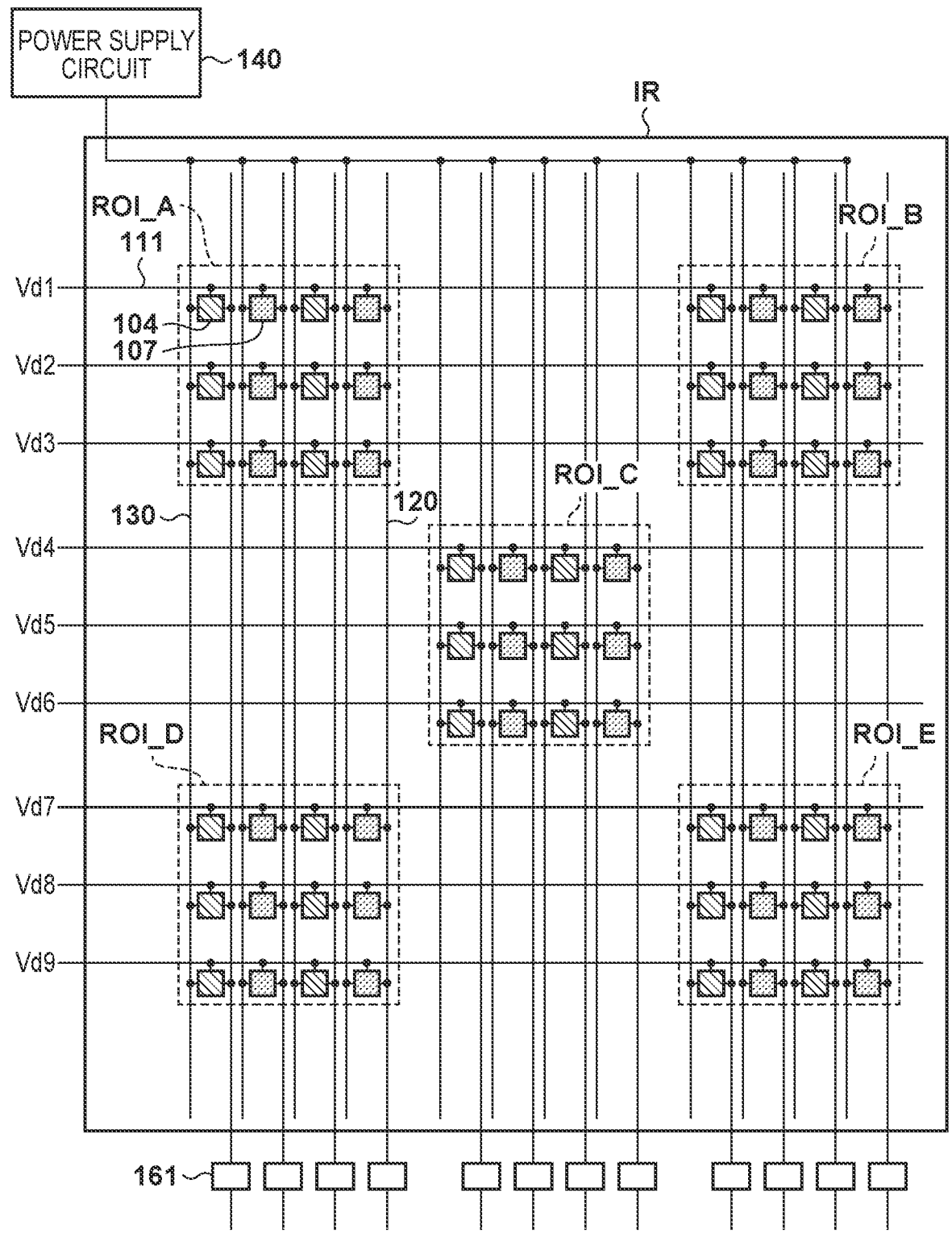
FIG. 7 is a view showing the positional relationship among detection pixels and correction pixels according to the first embodiment of the present invention.
Figure 8:
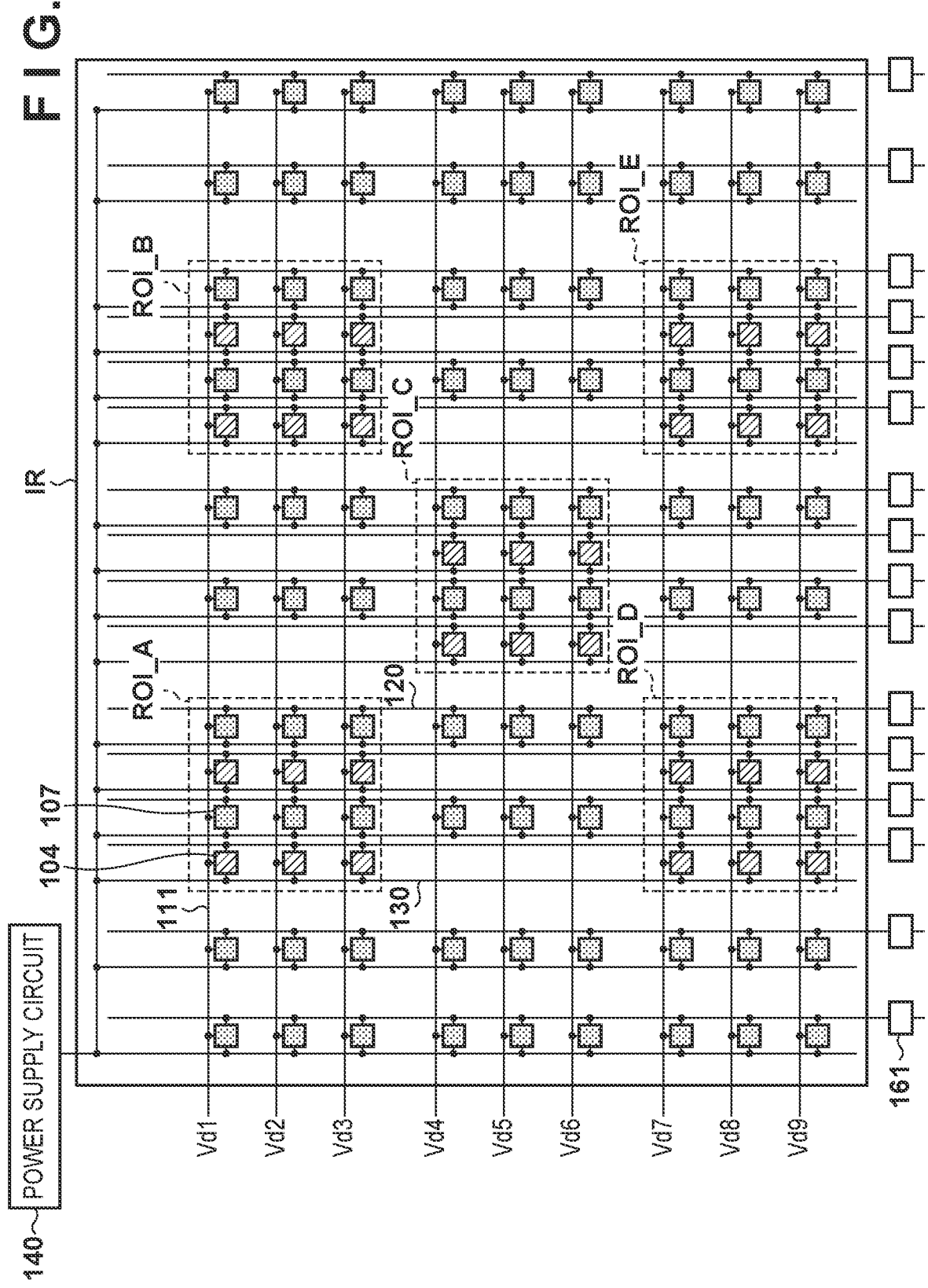
FIG. 8 is a view showing the positional relationship among the detection pixels and the correction pixels according to the first embodiment of the present invention.

In the example shown in FIG. 7, the detection pixels 104 and the correction pixels 107 are arranged only in the regions ROI_A to ROI_E of interest, and are not arranged in the remaining region. In the example shown in FIG. 8, the detection pixels 104 are arranged only in the regions ROI_A to ROI_E of interest, and are not arranged in the remaining region. On the other hand, the correction pixels 107 are arranged in the regions ROI_A to ROI_E of interest and in the remaining region.

Figure 9:
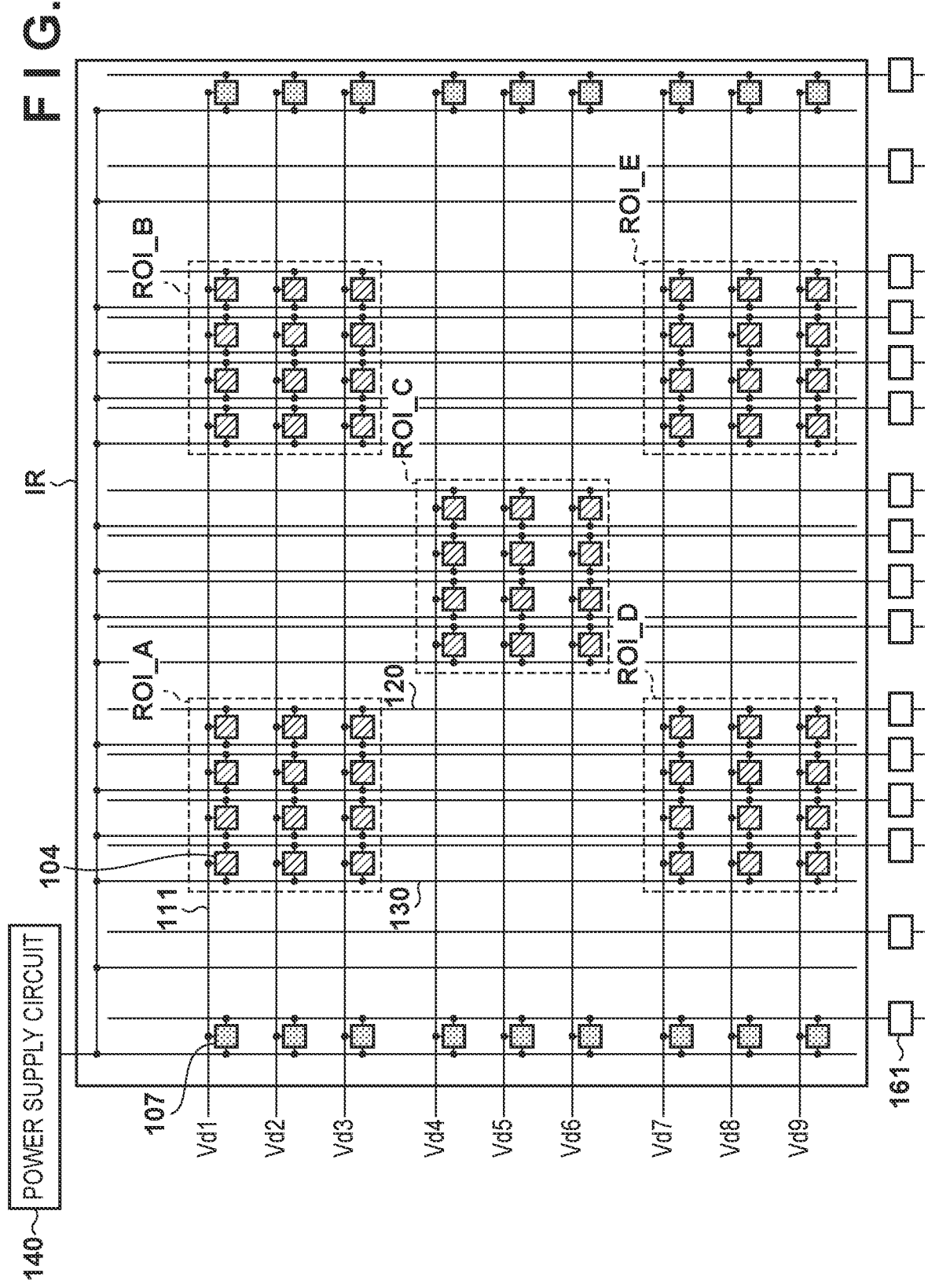
FIG. 9 is a view showing the positional relationship among the detection pixels and the correction pixels according to the first embodiment of the present invention.

In the example shown in FIG. 9, the detection pixels 104 are arranged only in the regions ROI_A to ROI_E of interest, and are not arranged in the remaining region. On the other hand, the correction pixels 107 are arranged not in the regions ROI_A to ROI_E of interest but in the remaining region. In this arrangement, the number of detection pixels 104 in each region of interest can be increased. The correction pixels 107 are arranged near edges of the imaging region IR. The correction pixels 107 may be arranged in a portion outside the effective pixel region, such as the farthest end. Since the sensitivity of each correction pixel 107 for radiation is low, the correction pixel 107 cannot be used to acquire an image signal. By arranging the correction pixels 107 near the edges of the imaging region IR, the influence of deficiency of the radiation image can be reduced.

Figure 10:
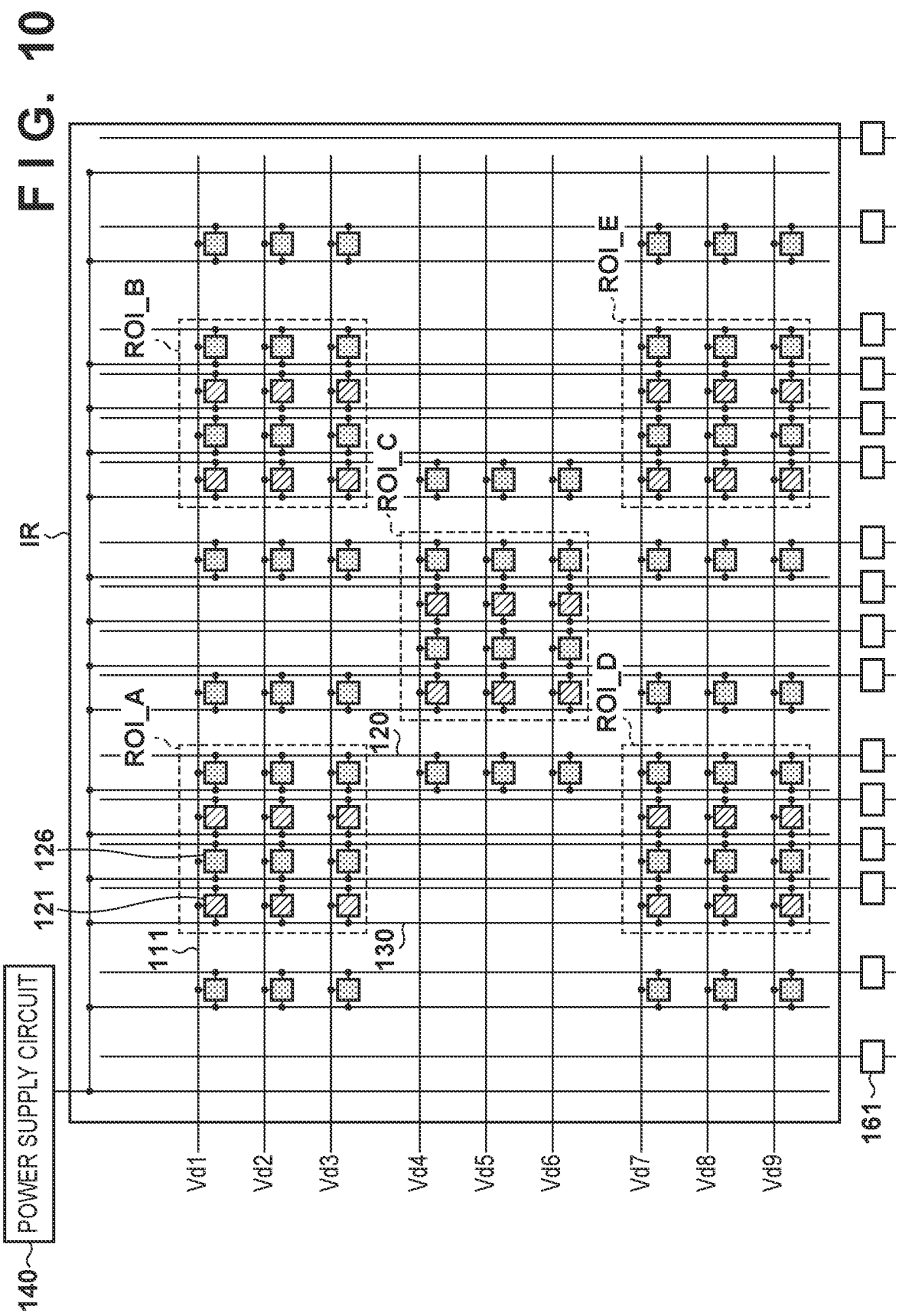
FIG. 10 is a view showing the positional relationship among the detection pixels and the correction pixels according to the first embodiment of the present invention.

In the example shown in FIG. 10, the detection pixels 104 are arranged only in the regions ROI_A to ROI_E of interest, and are not arranged in the remaining region. On the other hand, the correction pixels 107 are arranged in the regions ROI_A to ROI_E of interest and in the remaining region. More specifically, the correction pixels 107 are arranged in the periphery of each region of interest. The barycenter of each region of interest almost coincides with the barycenter of the plurality of correction pixels 107 arranged in correspondence with the region of interest. This arrangement makes it possible to reduce the influence of a small difference in resistance or capacitance of the pixel or a difference in how the driving signal is transmitted through the detection driving line 111.

Second Embodiment

A radiation imaging apparatus according to the second embodiment will be described. The arrangement of the radiation imaging apparatus according to the second embodiment may be the same as that according to the first embodiment. Therefore, the radiation imaging apparatus according to the second embodiment is also represented as a radiation imaging apparatus 100. In the second embodiment, the operation of the radiation imaging apparatus 100 is different from that in the first embodiment. The remaining points may be the same as in the first embodiment and a repetitive description thereof will be omitted.

Figure 11:
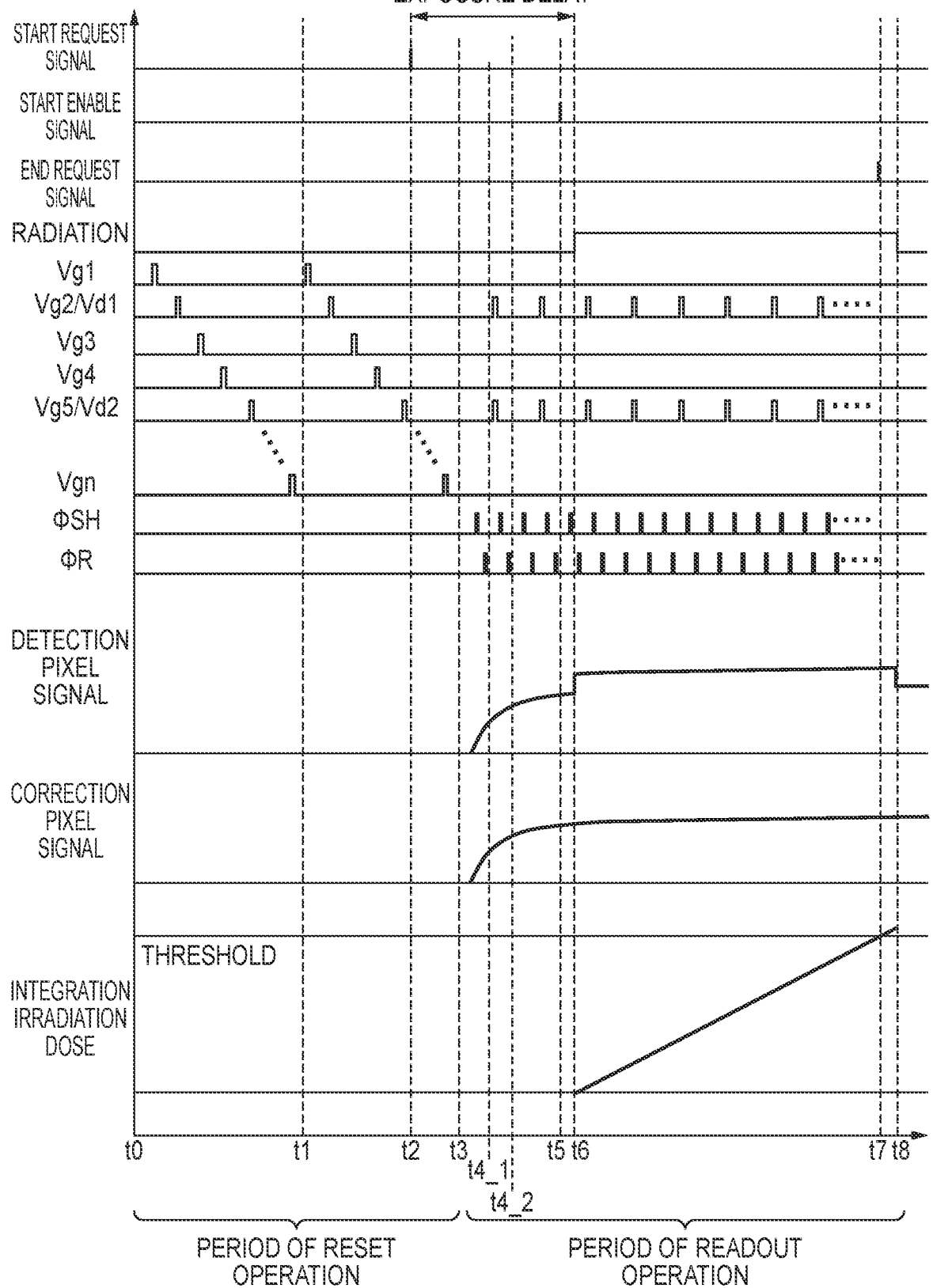
FIG. 11 is a timing chart showing the operation of a radiation imaging apparatus according to the second embodiment of the present invention.

An example of the operation of the radiation imaging apparatus 100 according to this embodiment will be described with reference to FIG. 11. After the end of a reset operation, a control unit 180 starts to execute a readout operation repeatedly at time t3. In this embodiment, after the end of the reset operation, the control unit 180 holds a signal based on the potential of a signal line 120 in a sample/hold circuit SH by temporarily setting a control signal φSH at high level without supplying a driving signal to a detection pixel 104 or a correction pixel 107. After that, the control unit 180 resets a readout circuit 160 by temporarily setting a control signal φR at high level. The operation performed from time t3 to time t4_1 will be referred to as an acquisition operation hereinafter.

After that, at time t4_1, the control unit 180 temporarily supplies the driving signal to the detection pixel 104 and the correction pixel 107, and temporarily sets the control signal φSH at high level, thereby holding the signals read out from the signal line 120 in the sample/hold circuit SH. After that, the control unit 180 resets the readout circuit 160 by temporarily setting the control signal φR at high level. The operation performed from time t4_1 to time t4_2 will be referred to as a readout operation hereinafter. This readout operation is the same as that in the first embodiment. The control unit 180 alternately, repeatedly executes the acquisition operation and the readout operation.

After the end of the reset operation, the control unit 180 executes the acquisition operation and the readout operation a predetermined number of times, which is one or more. A signal processing unit 170 decides a correction value Od1 based on the signal acquired by the acquisition operation with respect to the signal line 120 to which the detection pixel 104 is connected, and a correction value Oc1 based on the signal acquired by the acquisition operation with respect to the signal line 120 to which the correction pixel 107 is connected. Furthermore, the signal processing unit 170 decides a correction value Od2 based on the signals read out from the detection pixels 104 by the predetermined number of readout operations and the correction value Oc2 based on the signals read out from the correction pixels 107 by the predetermined number of readout operations. The correction values Od1 and Oc1 can be decided in the same manner as that for the above-described correction values Od and Oc. The correction values Od2 and Oc2 are the same values as the above-described correction values Od and Oc.

At time t5, the control unit 180 repeatedly executes the above-described acquisition operation and readout operation after transmitting a start enable signal. The signal processing unit 170 measures a radiation irradiation dose DOSE for each readout operation, and determines whether the integration value exceeds a threshold.

A method of deciding the irradiation dose DOSE will be described below. The value of the signal acquired by the latest acquisition operation with respect to the signal line 120 to which the detection pixel 104 is connected is represented by Sd1. The value of the signal acquired by the latest acquisition operation with respect to the signal line 120 to which the correction pixel 107 is connected is represented by Sc1. The value of the signal read out from the detection pixel 104 by the latest readout operation is represented by Sd2. The value of the signal readout from the correction pixel 107 by the latest readout operation is represented by Sc2. The values Sd2 and Sc2 are the same as the above-described values Sd and Sc. The signal processing unit 170 calculates the irradiation dose DOSE by applying Sd1, Sc1, Od1, Oc1, Sd2, Sc2, Od2, and Oc2 to equation (3) below.

$$DOSE=\{(Sd2-Od2)-(Sd1-Od1)\}-\{(Sc2-Oc2)-(Sc1-Oc1)\} \quad (3)$$

According to this equation, the irradiation dose DOSE is decided based on the difference between the value Sc1 of the signal readout from the correction pixel 107 after transmitting the start enable signal and the correction value Oc1 decided based on the signal read out from the correction pixel 107 before transmitting the start enable signal.

The signal processing unit 170 may calculate the irradiation dose DOSE by applying Sd1, Sc1, Od1, Oc1, Sd2, Sc2, Od2, and Oc2 to equation (4) below, instead of equation (3) above.

$$DOSE=(Sd2-Sd1)-(Od2-Od1)\times(Sc2-Sc1)/(Oc2-Oc1) \quad (4)$$

According to this equation, the irradiation dose DOSE is decided based on a ratio between the value Sc1 of the signal read out from the correction pixel 107 after transmitting the start enable signal and the correction value Oc1 decided based on the signal read out from the correction pixel 107 before transmitting the start enable signal. The remaining operations may be same as in the first embodiment and a repetitive description thereof will be omitted.

Effects according to this embodiment will be described below. A parasitic capacitance is formed between one signal line 120 and the electrode of a conversion element included in each pixel connected to the signal line 120. The signal line 120 and the electrode of the conversion element undergo capacitive coupling by this parasitic capacitance, thereby generating a crosstalk. Therefore, if, while a signal is read out from the conversion element of each pixel of a given row via the signal line 120, the potential of the electrode of the conversion element of each pixel of another row changes by photoelectric conversion, the potential of the signal line 120 may change by a crosstalk. This change may worsen the accuracy of decision of the radiation irradiation dose.

Since a signal based on the potential of the signal line 120 is acquired in the above-described acquisition operation in a state in which a switch element is not rendered conductive, it is possible to extract only a crosstalk signal. Since a signal is read out after the switch element is rendered conductive in the above-described readout operation, it is possible to read out a summation signal of signals accumulated in the conversion element in addition to the crosstalk. If the time from when the potential of the signal line 120 is reset until sampling is performed is the same between the acquisition operation and the readout operation, crosstalk amounts are almost equal to each other. Thus, the crosstalk can be corrected by calculating the difference between the crosstalk amounts. Furthermore, the offset component can be corrected by equations (3) and (4) above, similar to the first embodiment.

Third Embodiment

A radiation imaging apparatus according to the third embodiment will be described. The arrangement of the radiation imaging apparatus according to the third embodiment may be the same as that according to the first embodiment. Therefore, the radiation imaging apparatus according to the third embodiment is also represented as a radiation imaging apparatus 100. In the third embodiment, the operation of the radiation imaging apparatus 100 is different from that in the first embodiment. The remaining points may be the same as in the first embodiment and a repetitive description thereof will be omitted.

Figure 12:
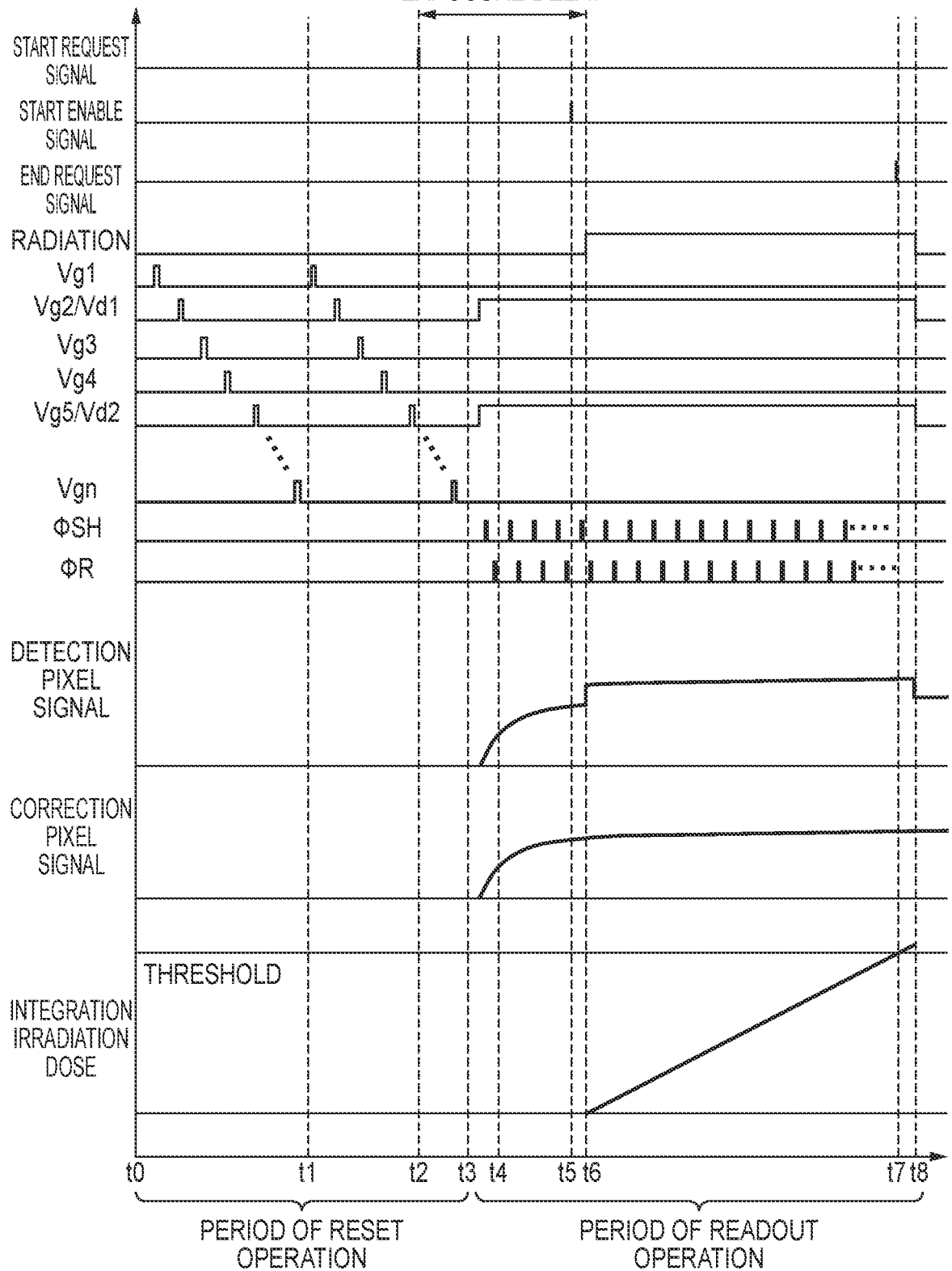
FIG. 12 is a timing chart showing the operation of a radiation imaging apparatus according to the third embodiment of the present invention.

An example of the operation of the radiation imaging apparatus 100 according to this embodiment will be described with reference to FIG. 12. After the end of a reset operation, a control unit 180 starts to execute a readout operation repeatedly at time t3. In this embodiment, after the end of the reset operation, the control unit 180 maintains a state in which a driving signal is supplied to a detection pixel 104 and a correction pixel 107 via a detection driving line 111. Therefore, the switch elements of the detection pixel 104 and the correction pixel 107 are maintained in an ON state. While maintaining this state, the control unit 180 decides a radiation dose during irradiation. More specifically, the control unit 180 holds, in a sample/hold circuit SH, signals read out by a readout circuit 160 from pixels through a signal line 120 by temporarily setting a control signal φSH at high level. After that, the control unit 180 resets the readout circuit 160 (more specifically, a differential amplification circuit AMP of an amplification unit 161) by temporarily setting a control signal φR at high level. The remaining operations may be the same as in the first embodiment and a repetitive description will be omitted.

Fourth Embodiment

A radiation imaging apparatus according to the fourth embodiment will be described. The arrangement of the radiation imaging apparatus according to the fourth embodiment may be the same as that according to the first embodiment. Therefore, the radiation imaging apparatus according to the fourth embodiment is also represented as a radiation imaging apparatus 100. In the fourth embodiment, the operation of the radiation imaging apparatus 100 is different from that in the first embodiment. The remaining points may be the same as in the first embodiment and a repetitive description thereof will be omitted.

Figure 13:
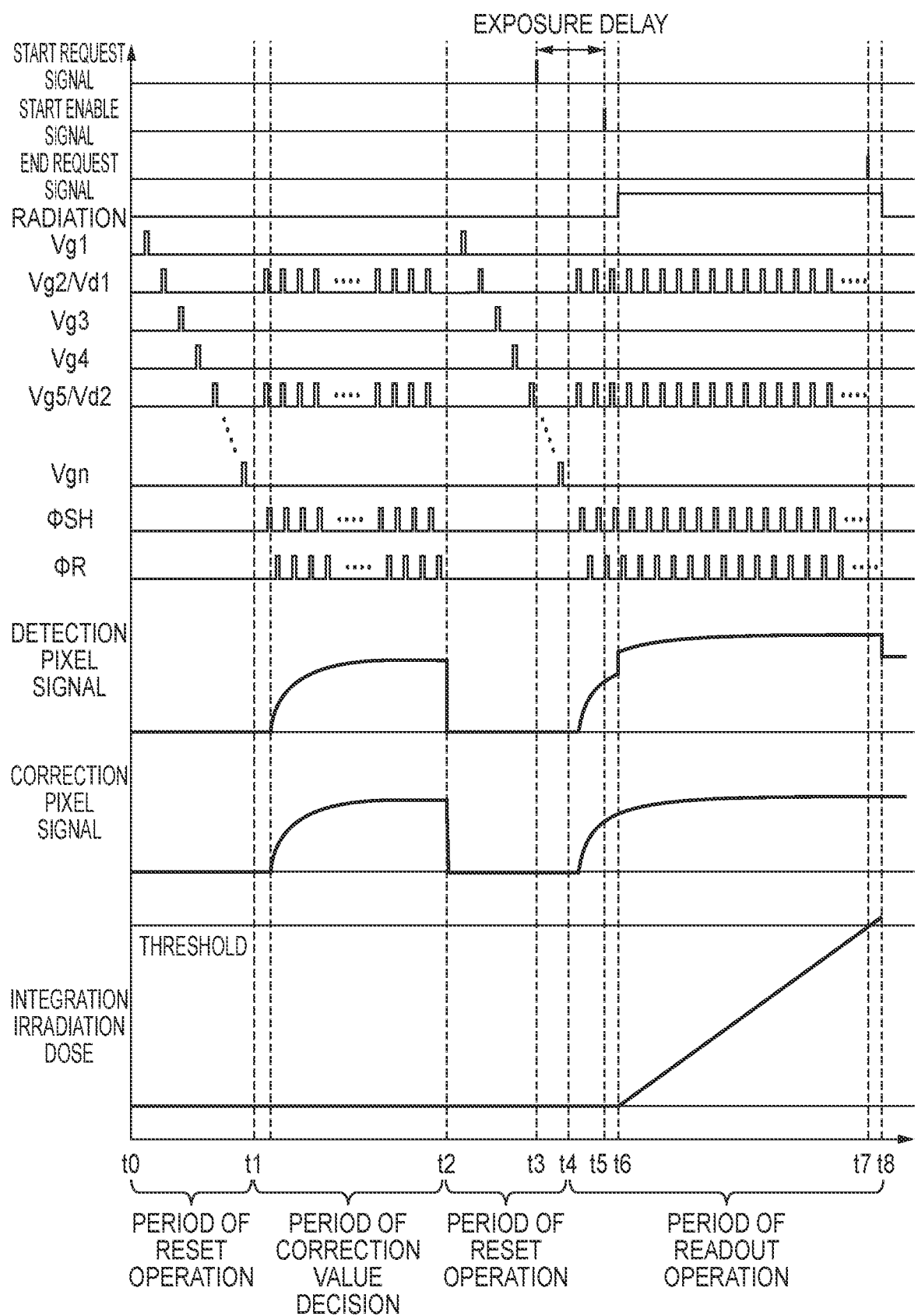
FIG. 13 is a timing chart showing the operation of a radiation imaging apparatus according to the fourth embodiment of the present invention.

An example of the operation of the radiation imaging apparatus 100 according to this embodiment will be described with reference to FIG. 13. The radiation imaging apparatus 100 starts a reset operation at time t0, and repeats the reset operation. At time t1, a control unit 180 performs a readout operation of reading out signals from a detection pixel 104 and a correction pixel 107 once or more, and decides correction values Od and Oc described above. By deciding the correction values Od and Oc before a radiation irradiation start request signal is received, it is possible to prevent the decision operation from influencing a radiation exposure delay. Thus, it is possible to increase the number of readout operations for deciding the correction values Od and Oc (for example, several thousand). The values obtained by the plurality of readout operations can be averaged to reduce the noise influence of the correction values Od and Oc, thereby improving the correction accuracy.

After performing the predetermined number of readout operations, the control unit 180 repeats the reset operation again at time t2. Upon receiving the radiation irradiation start request signal at time t3, the control unit 180 performs the reset operation up to the last row, and then starts the readout operation at time t4. Since the control unit 180 has already decided the correction values Od and Oc, the correction values Od and Oc need not be decided after time t4. After that, the control unit 180 transmits a start enable signal at time t5, and starts radiation irradiation at time t6. Since the correction values Od and Oc have already been decided, the control unit 180 can start radiation irradiation immediately after receiving the start request signal. Therefore, it is possible to shorten the exposure delay by a time required to decide the correction values Od and Oc.

After a predetermined time (for example, several ms to several tens of ms) elapses since the shift from the reset operation to the readout operation, the control unit 180 may transmit the start enable signal to start radiation irradiation. This makes it possible to suppress readout of a signal during a period in which an output variation immediately after switching the operation is large. After the start of radiation irradiation, signal correction is performed in the same manner as that in the first embodiment, thereby deciding the irradiation dose. In this embodiment, as compared with the first embodiment, the time from when the correction values Od and Oc are acquired until readout of the irradiation dose starts is long. Thus, the offset component of the value Sd of the signal may vary. However, since the variation amount is the same between the detection pixel 104 and the correction pixel 107, it is possible to perform correction by the same processing as that in the first embodiment. The timing of deciding the correction values Od and Oc in this embodiment is applicable to not only the first embodiment but also the second and third embodiments.

The timing of deciding the correction values Od and Oc before receiving the start request signal can vary. For example, the timing may be one of the timing of shipping the radiation imaging apparatus 100, the timing of installing the radiation imaging apparatus 100 in a use facility, the timing of activating the radiation imaging apparatus 100, and/or the timing of acquiring an offset image before the radiation imaging apparatus 100 captures a radiation image.

Assume that the radiation imaging apparatus 100 operates to acquire an offset image of a captured image in advance and acquire, at the time of imaging, only an image after radiation irradiation. In this case, the control unit 180 may decide the correction values Od and Oc when the offset image is acquired in advance. Since the offset image of the captured image is individually acquired for each driving mode (a frame rate, a gain value, a pixel binning count, an image size, and the like), it takes about several tens of sec to acquire the offset image. Since it takes only about several sec to decide the correction values Od and Oc, even if the correction values Od and Oc are decided during this period, the offset image acquisition time is hardly influenced. In this case, the correction values Od and Oc are decided for each operation type of the radiation imaging apparatus 100. Instead, the correction values Od and Oc may be decided commonly to a plurality of operation types of the radiation imaging apparatus.

The offset image of the captured image is updated periodically to deal with a change in environment such as the temperature. Since the correction values Od and Oc also slightly change due to a change in environment, the correction values Od and Oc are updated periodically to make it easy to deal with the change in environment.

If the radiation imaging apparatus 100 acquires the offset image of the captured image before and after radiation irradiation, the correction values Od and Oc may be decided at the same timing as the offset image acquisition timing. By deciding the correction values Od and Oc at a timing close to the radiation irradiation timing, the difference between the offset component at the time of detecting radiation and that at the time of deciding the correction values Od and Oc becomes small, thereby improving the correction accuracy. In addition, the period of deciding the correction values Od and Oc does not influence the timing at which radiation irradiation can start.

The examples of acquiring the correction values Od and Oc at various timings have been described above. The control unit 180 may store the correction values Od and Oc acquired at a plurality of timings, and select the correction values Od and Oc to be used for correction based on information of the environment such as the temperature or information of an elapsed time since acquisition. For example, the control unit 180 may monitor the temperature of the radiation imaging apparatus 100, and use the correction values Od and Oc acquired in the temperature environment close to that at the time of detecting radiation. This can suppress the influence of the offset component which changes in accordance with the temperature. Alternatively, the control unit 180 may further improve the correction accuracy by using the average values of the pluralities of correction values Od and Oc acquired in the close temperature environment. For example, the control unit 180 can suppress the influence of the offset component that temporally changes, by recording the time from when the correction values Od and Oc are decided until radiation is detected and using the correction values Od and Oc for which not so long time elapses after they are decided. The control unit 180 can improve the correction accuracy by using the average values of the pluralities of correction values Od and Oc for which not so long time elapses.

The readout operation for deciding the correction values Od and Oc may be performed in a plurality of times, as shown in FIG. 14, instead of being performed several thousand times at once. After executing the reset operation at time t0, the control unit 180 decides the correction values Od and Oc by executing the readout operation, for example, several hundred times at time t1. After that, the control unit 180 decides the correction values Od and Oc by executing the reset operation again at time t2, and then executing the readout operation, for example, several hundred times at time t3. Similarly, the reset operation and the correction value decision operation are repeated. The control unit 180 decides the correction values Od and Oc to be used for correction by averaging the pluralities of correction values Od and Oc decided in this way. By performing the operation of deciding the correction values Od and Oc in a plurality of times, the accuracy of the correction values Od and Oc can be improved while deciding a pair of correction values Od and Oc at time t1.

Fifth Embodiment

In the above-described embodiment, the control unit 180 decides the common correction values Od and Oc for the plurality of regions of interest. Instead, a control unit 180 may decide correction values Od and Oc for each region of interest. FIG. 15 shows an example of acquiring the correction values Od and Oc during a reset operation before radiation irradiation in the arrangement of the regions of interest shown in FIG. 7. High level of a row of each region of interest represents a readout operation for deciding the correction values Od and Oc. In a period 1501, the control unit 180 decides the correction values Od and Oc for one region of interest or a plurality of regions of interest arrayed in the horizontal direction in FIG. 7. In a period 1502, the control unit 180 decides the correction values Od and Oc for a plurality of regions of interest arrayed in the vertical direction in FIG. 7. If an irradiation dose is detected in each of a plurality of regions of interest arrayed in the vertical direction by one imaging operation, the control unit 180 alternately operates rows corresponding to the respective regions of interest to individually read out the outputs from the regions of interest.

Referring to FIG. 15, the control unit 180 continuously decides the correction values Od and Oc of the regions of interest. However, before deciding each set of the correction values Od and Oc, the reset operation may be performed. When actually detecting radiation, the irradiation dose readout operation is performed after the reset operation. Thus, by acquiring each set of the correction values Od and Oc after the reset operation, a change in offset component after driving switching is the same, thereby improving the correction accuracy.

Other Embodiments

Figure 16:
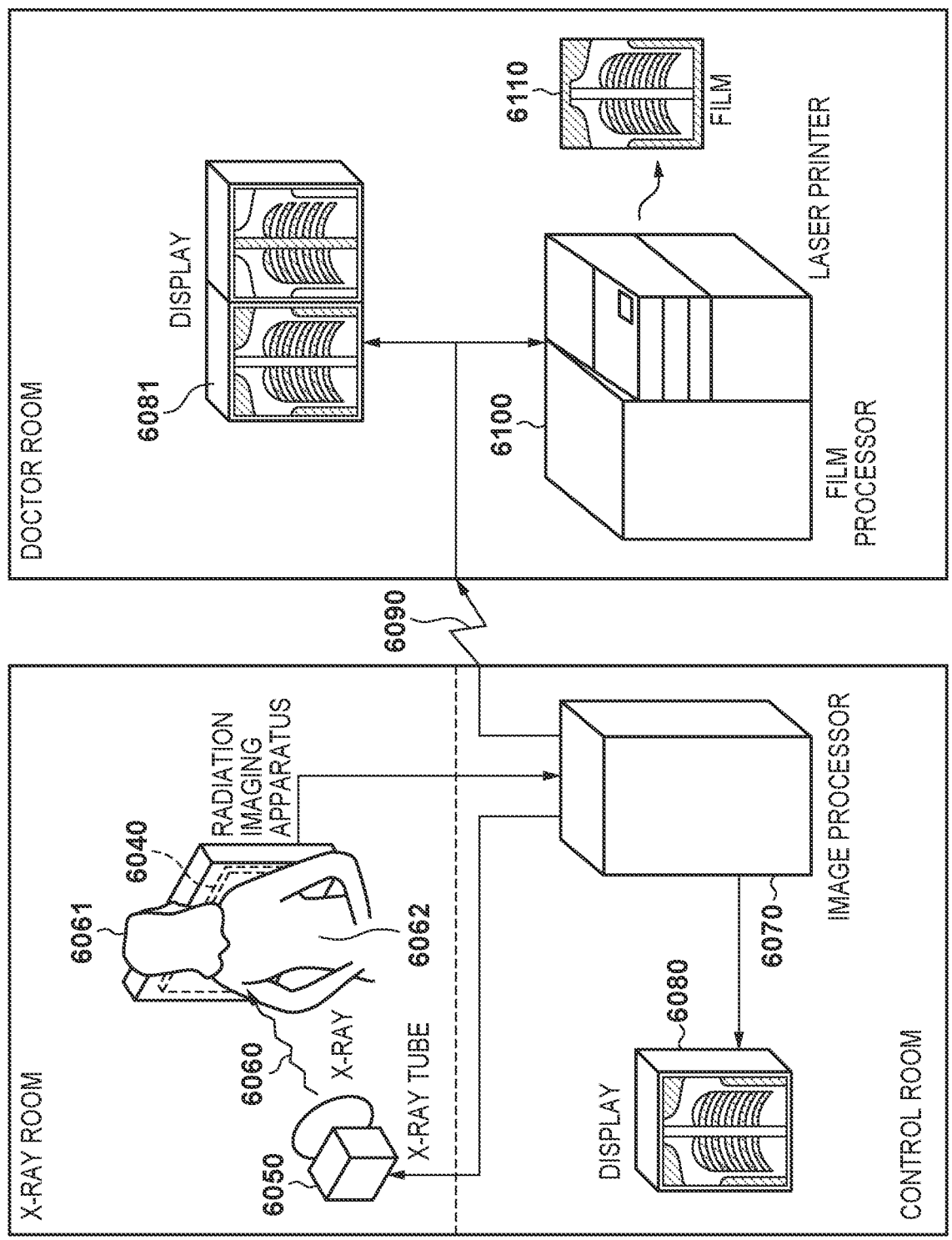
FIG. 16 is a view showing an example of the arrangement of a radiation imaging system.

An example of applying a radiation imaging apparatus 100 to a radiation detecting system will be described below with reference to FIG. 16. An X-ray 6060 generated by an X-ray tube 6050 as a radiation source enters a radiation imaging apparatus 6040 represented by the above-described radiation imaging apparatus 100 through a chest 6062 of a patient or subject 6061. This incident X-ray contains information of the interior of the body of the subject 6061. A scintillator emits light in response to the incidence of the X-ray, and photoelectric conversion elements photoelectrically convert the light, thereby obtaining electrical information. This information is converted into digital data, undergoes image processing by an image processor 6070 serving as a signal processing unit, and can be observed on a display 6080 serving as a display unit of a control room.

This information can also be transferred to a remote place by a transmission processing unit such as a telephone line 6090, and can be displayed on a display 6081 serving as a display unit of a doctor room or the like in another place or saved in a storage unit such as an optical disk. Thus, a doctor in the remote place can make a diagnosis. In addition, this information can be recorded on a film 6110 serving as a recording medium by a film processor 6100 serving as a recording unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-221681, filed Nov. 27, 2018, and Japanese Patent Application No. 2019-171854, filed Sep. 20, 2019, which are hereby incorporated by reference herein in their entirety.

What is claimed is:

1. A radiation imaging, apparatus, comprising:
   a plurality of pixels including a first and second pixels, the second pixel having a lower sensitivity for radiation than that of the first pixel; and
   a decision unit configured to execute a reset operation of resetting charges accumulated in the plurality of pixels, and a decision operation of deciding a radiation dose during irradiation to the radiation imaging apparatus, the decision unit being configured to end the reset operation and start the decision operation before a start of radiation irradiation, wherein in the decision operation, the decision unit is configured to (i) read out signals from the first pixel and the second pixel at least once before the start of radiation irradiation, and decide a first correction value based on the signal read out from the first pixel and a second correction value based on the signal read out from the second pixel, and (ii) read out signals from the first pixel and the second pixel after receiving a radiation irradiation start request, and decide the radiation dose during irradiation to the radiation imaging apparatus using a value of the signal read out from the first pixel, a value of the signal read out from the second pixel, the first correction value and the second correction value.

2. The apparatus according to claim 1, wherein the decision unit is configured to end the reset operation and start the decision operation before receiving the radiation irradiation start request, and perform the reset operation again after deciding the first correction value and the second correction value in the decision operation.

3. The apparatus according to claim 1, wherein the decision unit is configured to decide the first correction value and the second correction value for each region of interest or each operation type of the radiation imaging apparatus.

4. The apparatus according to claim 1, wherein the decision unit is configured to decide the first correction value and the second correction value, both of which are common to a plurality of regions of interest or a plurality of operation types of the radiation imaging apparatus.

5. The apparatus according to claim 1, wherein the decision unit is configured to decide the first correction value and the second correction value at one of a timing of shipping the radiation imaging apparatus, a timing of installing the radiation imaging apparatus in a use facility, a timing of activating the radiation imaging apparatus, and/or a timing of acquiring an offset image before the radiation imaging apparatus captures a radiation image.

6. The apparatus according to claim 1, wherein the decision unit is configured to end the reset operation and start the decision operation after receiving the radiation irradiation start request, make a notification that radiation irradiation can start, after reading out signals from the first pixel and the second pixel at least once in the decision operation, and after the notification, read out signals from the first pixel and the second pixel, and decide the radiation dose during irradiation to the radiation imaging apparatus using a value of the signal read out from the first pixel, a value of the signal read out from the second pixel, the first correction value and the second correction value.

7. The apparatus according to claim 1, wherein the plurality of pixels is arranged to form a plurality of rows and a plurality of columns, the radiation imaging apparatus further includes (i) a plurality of driving lines arranged in correspondence with the plurality of rows, (ii) a plurality of signal lines arranged in correspondence with the plurality of columns, (iii) a driving circuit configured to supply driving signals to target pixels of one of the reset operation and/or the decision operation through the plurality of driving lines, and (iv) a readout circuit configured to read out signals from the plurality of pixels through the plurality of signal lines, the decision unit is configured to execute the reset operation and the decision operation by controlling the driving circuit and the readout circuit, the driving circuit supplies the driving signals to each of the plurality of driving lines in the reset operation, and in the decision operation the driving circuit is configured to supply the driving signal to a driving line among the plurality of driving lines that is connected to at least one of the first pixel and/or the second pixel, and not to supply the driving signal to a driving line among the plurality of driving lines that is connected to neither the first pixel nor the second pixel.

8. The apparatus according to claim 7, wherein the second pixel is not connected to the signal line among the plurality of signal lines to which the first pixel is connected.

9. The apparatus according to claim 7, wherein the driving circuit is configured to simultaneously supply the driving signals to the driving lines among the plurality of driving lines to each of which at least one of the first and second pixel is connected.

10. The apparatus according to claim 7, wherein in the decision operation the decision unit is configured to decide the radiation dose during irradiation to the radiation imaging apparatus using values of signals based on potentials of the signal lines connected to the first pixel and the second pixel in a state in which the driving signals are not supplied to the first pixel and the second pixel.

11. The apparatus according to claim 10, wherein in the decision operation the decision unit is configured to correct, by the signals based on the potentials of the signal lines connected to the first pixel and the second pixel in the state in which the driving signals are not supplied to the first pixel and the second pixel, values of the signals based on the potentials of the signal lines connected to the first pixel and the second pixel in the state in which the driving signals are not supplied to the first pixel and the second pixel after a notification that radiation irradiation can start, and the decision unit is configured to correct, by the signals based on potentials of the signal lines connected to the first pixel and the second pixel in a state in which the driving signals are supplied to the first pixel and the second pixel, values of signals based on potentials of the signal lines connected to the first pixel and the second pixel in the state in which the driving signals are supplied to the first pixel and the second pixel after the notification.

12. The apparatus according to claim 7, wherein the decision unit is configured to decide the radiation dose during irradiation to the radiation imaging apparatus while maintaining a state in which the driving signals are supplied to the first pixel and the second pixel to decide the first correction value and the second correction value.

13. The apparatus according to claim 1, wherein the decision unit is configured to decide the radiation dose during irradiation to the radiation imaging apparatus using a difference between the second correction value and the value of the signal read out from the second pixel after a notification that radiation irradiation can start.

14. The apparatus according to claim 1, wherein the decision unit is configured to decide the radiation dose during irradiation to the radiation imaging apparatus using a ratio between the second correction value and the value of the signal read out from the second pixel after a notification that radiation irradiation can start.

15. The apparatus according to claim 1, wherein each of the first pixel and the second pixel includes a photoelectric conversion element capable of converting light into an electrical signal, and
 the second pixel includes a light-shielding member configured to cover the photoelectric conversion element of the second pixel.

16. The apparatus according to claim 1, wherein some of the plurality of pixels are included in a region of interest, and
 the second pixel is arranged outside the region of interest.

17. The apparatus according to claim 1, wherein the plurality of pixels are arranged in an imaging region, and
 the second pixel is arranged near an edge of the imaging region.

18. The apparatus according to claim 1, wherein some of the plurality of pixels are included in a region of interest, and
 a barycenter of the region of interest ides with a barycenter of the plurality of second pixels arranged with respect to the region of interest.

19. The apparatus according to claim 1, wherein the decision unit is configured to continuously decide the radiation dose during irradiation to the radiation imaging apparatus by repeating the decision operation after a notification that radiation irradiation can start.

20. A radiation imaging system comprising:
 the radiation imaging apparatus defined in claim 1; and
 a signal processing unit configured to process a signal from the radiation imaging apparatus.

* * * * *